United States Patent
Cheong et al.

(10) Patent No.: US 10,920,061 B2
(45) Date of Patent: Feb. 16, 2021

(54) SELF-HEALING ACRYLIC COPOLYMER, CROSSLINKED COPOLYMER PREPARED FROM THE ACRYLIC COPOLYMER AND METHOD FOR LOW-TEMPERATURE SELF-HEALING OF THE CROSSLINKED COPOLYMER

(71) Applicant: KYUNGPOOK NATIONAL UNIVERSITY INDUSTRY-ACADEMIC COOPERATION FOUNDATION, Daegu (KR)

(72) Inventors: In Woo Cheong, Daegu (KR); Sung Hwan Ju, Seoul (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 99 days.

(21) Appl. No.: 16/236,728

(22) Filed: Dec. 31, 2018

(65) Prior Publication Data
US 2019/0203030 A1    Jul. 4, 2019

(30) Foreign Application Priority Data

Dec. 29, 2017 (KR) .......... 10-2017-0184097
Apr. 18, 2018 (KR) .......... 10-2018-0045090

(51) Int. Cl.
| | |
|---|---|
| C08L 33/00 | (2006.01) |
| C08L 33/06 | (2006.01) |
| C08L 33/08 | (2006.01) |
| B29C 73/16 | (2006.01) |
| C08L 33/14 | (2006.01) |
| B29C 73/22 | (2006.01) |

(52) U.S. Cl.
CPC .......... *C08L 33/066* (2013.01); *B29C 73/163* (2013.01); *B29C 73/22* (2013.01); *C08L 33/08* (2013.01); *C08L 33/14* (2013.01); *C08L 2312/00* (2013.01)

(58) Field of Classification Search
CPC ...................................... C08F 220/20
See application file for complete search history.

(56) References Cited

FOREIGN PATENT DOCUMENTS

| | | | |
|---|---|---|---|
| JP | 2016027152 A | * | 2/2016 |
| JP | 2016027153 A | * | 2/2016 |
| WO | WO-2013080639 A1 | * | 6/2013 .............. C08L 33/10 |

* cited by examiner

*Primary Examiner* — Mark S Kaucher
(74) *Attorney, Agent, or Firm* — NSIP Law

(57) ABSTRACT

Disclosed is a self-healing acrylic copolymer represented by Formula 1:

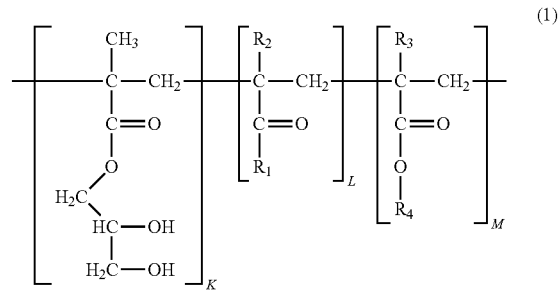

The acrylic copolymer can self-heal structural damages such as scratches with the aid of heat and water and possesses excellent physical properties at room temperature. Also disclosed is a crosslinked copolymer prepared from the acrylic copolymer.

18 Claims, 17 Drawing Sheets
(17 of 17 Drawing Sheet(s) Filed in Color)

Example 1

Example 2

Example 3

Example 4

Example 5

Example 6

Example 7

Example 8

Example 9

Example 10

Comparative Example 1

Example 11

After 2 h

Comparative Example 2

After 2 h

Example 12

After 2 h

Comparative Example 3

After 2 h

Comparative Example 4

After 2 h

Comparative Example 5

After 2 h

Example 1

GMB (5 °C)

HFB (5 °C)

SELF-HEALING ACRYLIC COPOLYMER, CROSSLINKED COPOLYMER PREPARED FROM THE ACRYLIC COPOLYMER AND METHOD FOR LOW-TEMPERATURE SELF-HEALING OF THE CROSSLINKED COPOLYMER

CROSS-REFERENCE TO RELATED APPLICATIONS

This application claims the benefit under 35 USC 119(a) of Korean Patent Application No. 10-2017-0184097 filed on Dec. 29, 2017 and Korean Patent Application No. 10-2018-0045090 filed on Apr. 18, 2018 in the Korean Intellectual Property Office, the entire disclosures of which are incorporated herein by reference for all purposes.

BACKGROUND OF THE INVENTION

1. Field of the Invention

The present invention relates to a self-healing acrylic copolymer, a crosslinked copolymer prepared from the acrylic copolymer, and a method for low-temperature self-healing of the crosslinked copolymer. More specifically, the present invention relates to an acrylic copolymer that can self-heal structural damages such as scratches with the aid of heat and water and possesses excellent physical properties at room temperature, a crosslinked copolymer prepared from the acrylic copolymer, and a method for low-temperature self-healing of the crosslinked copolymer.

2. Description of the Related Art

Polymers are indispensable materials in modern material industries and are widely used in various fields, including electrical/electronic, automobile, medical, and information technology. Recently, there has been an increasing demand for stimulus-responsive polymers that specifically respond to external stimuli while maintaining their inherent characteristics. Particularly, studies have focused on stimulus-responsive polymers that can "self-heal" damages. Polymeric materials tend to lose their inherent characteristics when damaged by external physical and chemical stimuli. Such damages have a great influence on the performance persistence of polymers and the durability of applied products.

Material damages are repaired by traditional methods, including welding and part replacement. However, repaired and unrepaired parts are distinguished from each other in their characteristics or there is a noticeable change in the appearance of material. Further, slight material damage is difficult to find at the initial stage, making it impossible to repair the damage before performance deterioration of the material. In contrast, self-healing polymers can easily cope with small damages due to their ability to self-heal. Some self-healing polymers cause no difference in performance between repaired portions and original portions, achieving improved durability. Therefore, self-healing polymers are expected to find a variety of applications, including coating agents, films, and medical materials. For example, self-healing polymers applied to automobile painting may remove surface scratches. Self-healing polymers may be applied to artificial skin materials. In this case, damaged sites can be healed, as in real skin.

Such self-healing properties can be obtained only when the following requirements are met. First, self-healing polymers should be able to induce factors capable of repairing cleaved bonds or attractive interactions, that is, intermolecular covalent bonds or supramolecular attractive interactions. Second, self-healing polymers should be able to bond damaged sites or possess sufficient mobility such that the factors can act. Papers based on the induction of such characteristics were published in leading journals in South Korea and other countries and can be broadly divided into three approaches.

The first approach is to add substances capable of healing damaged parts to materials. For example, monomers polymerizable in materials are inserted into capsules and are dispersed in polymeric materials. Such an approach was first published in 2001 in the journal Nature by Professor White's group at the University of Illinoi. According to this approach, Grubbs' catalyst is dispersed in an epoxy resin and dicyclopentadiene as a monomer is placed into urea-formaldehyde microcapsules to form a resin. However, the expensive catalyst dispersed in the material may cause stability problems. Another disadvantage is that repeated damage to the same site is difficult to heal. Many attempts have been made to overcome these disadvantages, for example, by introducing relatively economical tin-based catalysts or forming microchannels similar to blood vessels.

The second approach is to use supramolecular attractive interactions. In this connection, a deal of research has been conducted on supramolecular structures using various non-covalent bonds such as ionomers and $\pi$-$\pi$ stacking structures. Recent research results obtained using hydrogen bonds have received great attention. A representative paper was published in the journal Nature in 2008 by Leibler's group. According to this paper, self-healing capability is obtained using hydrogen bonds of diacid and triacid monomers and oligomers having urea groups. Self-healing polymers with improved physical properties using multiple intermolecular hydrogen bonds are also currently being investigated.

The third approach is to provide self-healing polymers using reversible covalent bonds. Much research is being conducted in various directions, for example, by thermo-reversible Diels-Alder reaction or introducing light-induced reversibly crosslinkable functional groups to form radicals and reform bonds. However, most of these methods require the application external energy or stimulus (temperature variation, pH variation or UV-visible light) or the supply of raw materials for repeated self-healing.

Taken together, self-healing polymers are required to have functional groups capable of repeated intermolecular covalent bonding and sufficient mobility for strong covalent bonds. Thus, repeated and continued self-healing effects can be achieved even without external stimuli. Furthermore, self-healing polymers having high transmittance (transparency) in the visible region can be utilized as materials for high value-added films and coatings of electronic products and optical products and automotive interior and exterior coatings.

Korean Patent Application No. 10-2016-0184035, which was filed by the present applicant, relates to a method for preparing a self-healing polymer including reacting an aliphatic diisocyanate with a polyol to form a polyurethane prepolymer (first step), reacting an aliphatic diisocyanate with tertiary butyldiamine to form a polyurea prepolymer (second step), and reacting the polyurethane prepolymer and the polyurea prepolymer with a crosslinking agent to form a polymer (third step).

Conventional self-healing polymers are imparted with thermal mobility by heating to or above their glass transition temperatures ($T_g$) in order to exhibit their self-healing capability. Alternatively, when the glass transition temperatures ($T_g$) of conventional self-healing polymers are lowered to improve their self-healing capability, poor mechanical strength is inevitably caused. Thus, there is a need for a method for self-healing of self-healing copolymers at low temperature in an easy manner.

SUMMARY OF THE INVENTION

Therefore, the present invention has been made in an effort to solve the above problems, and it is one object of the present invention to provide a self-healing acrylic copolymer.

It is a further object of the present invention to provide a self-healing crosslinked copolymer prepared by crosslinking the acrylic random copolymer.

It is another object of the present invention to provide a coating including the crosslinked copolymer.

It is another object of the present invention to provide a method for easily self-healing of a urethane-acrylic copolymer at a low temperature below the $T_g$ of the copolymer.

It is still another object of the present invention to provide a method for self-healing of the urethane-acrylic copolymer by introducing an increased amount of carbon dioxide ($CO_2$) into the urethane-acrylic copolymer to extend the self-healing temperature region.

One aspect of the present invention provides a self-healing acrylic random copolymer represented by Formula 1:

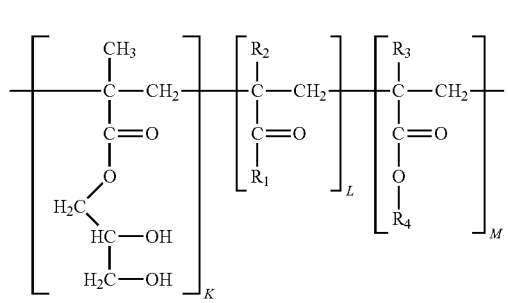

wherein $R_1$ is

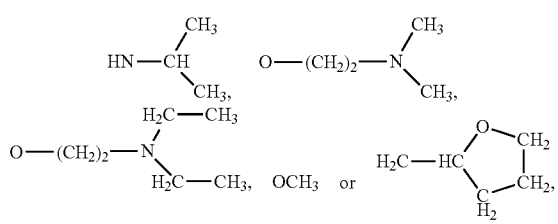

$R_2$ and $R_3$ are each independently H or $CH_3$, $R_4$ is a methyl or butyl group, and K, L, and M representing the mole fractions of the corresponding repeating units are 0.08, 0.5 to 0.9, and 0.02 to 0.42, respectively, and satisfy the relation K+L+M=1.

According to one embodiment of the present invention, the self-healing acrylic copolymer is represented by one of the following formulae:

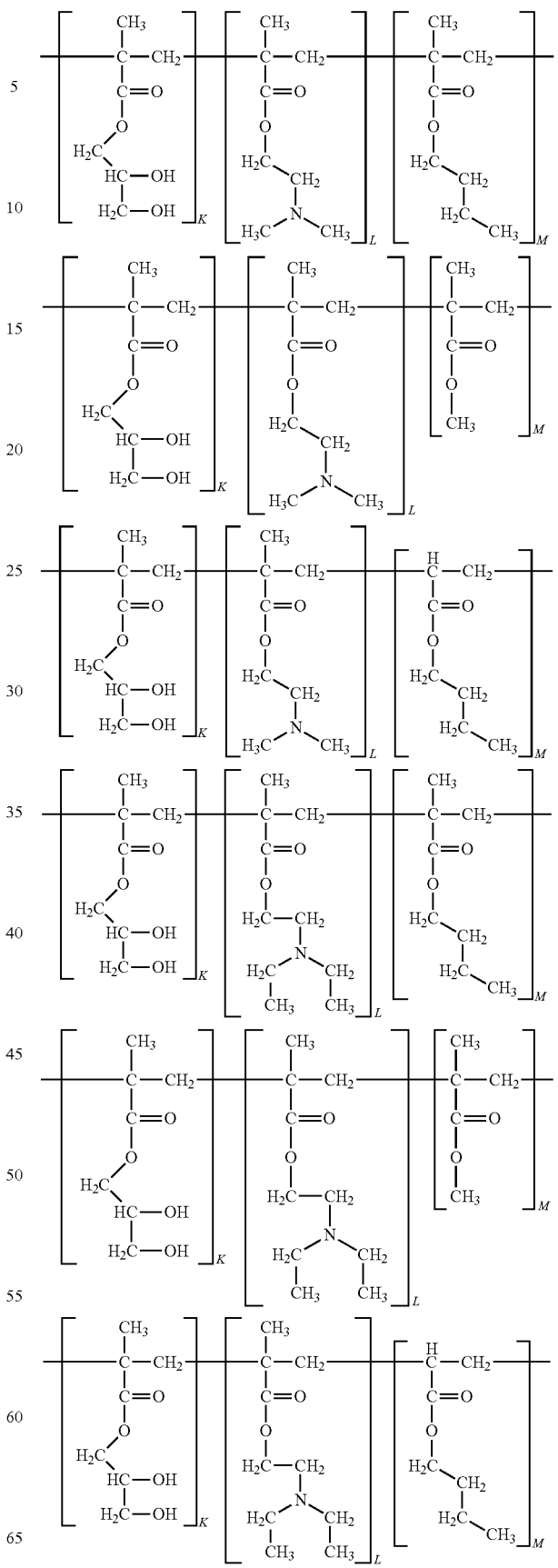

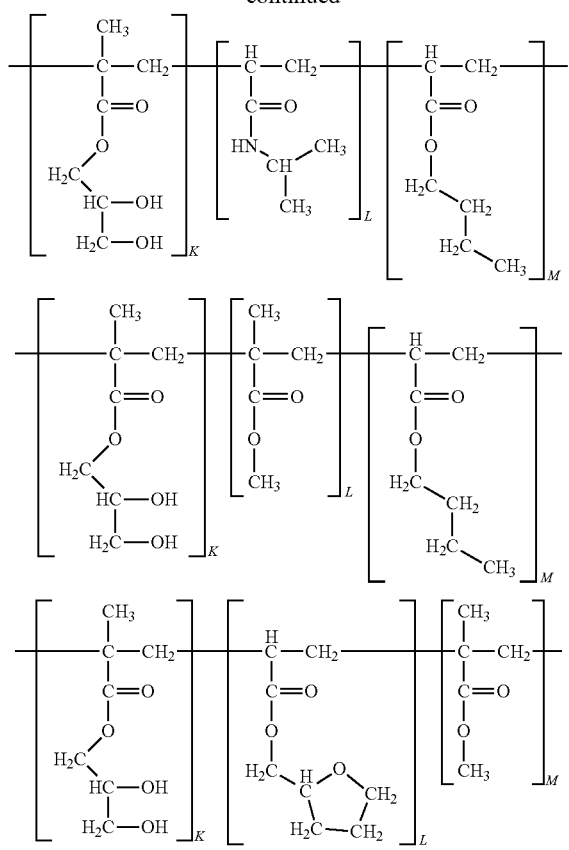
wherein K, L, and M representing the mole fractions of the corresponding repeating units are 0.089, 0.5 to 0.9, and 0.02 to 0.42, respectively, and satisfy the relation K+L+M=1.
According to one embodiment of the present invention, the self-healing acrylic copolymer is preferably represented by one of the following formulae:
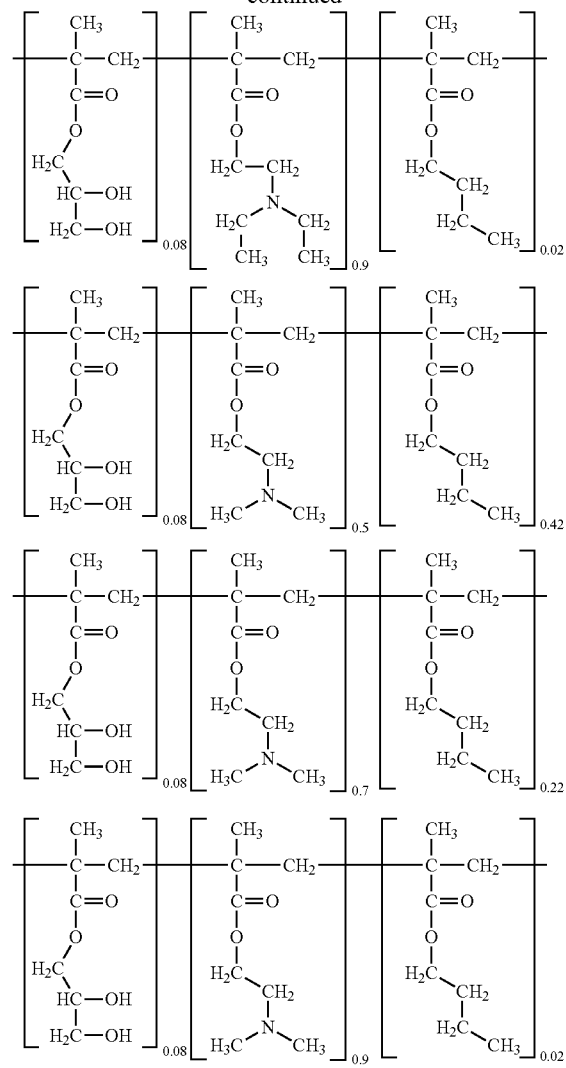
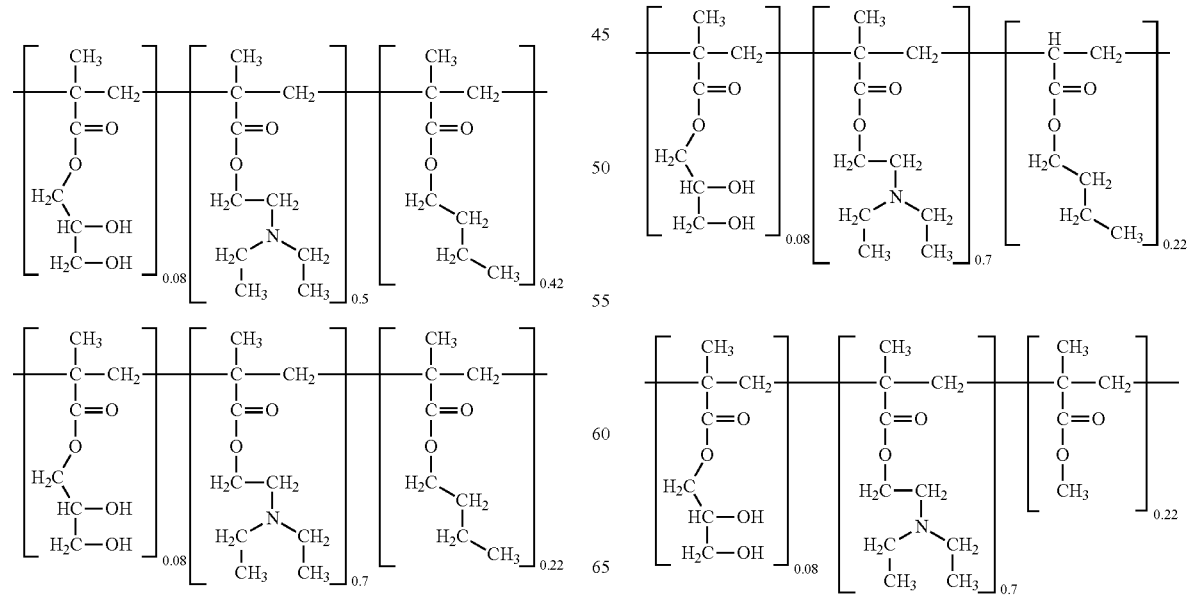

-continued

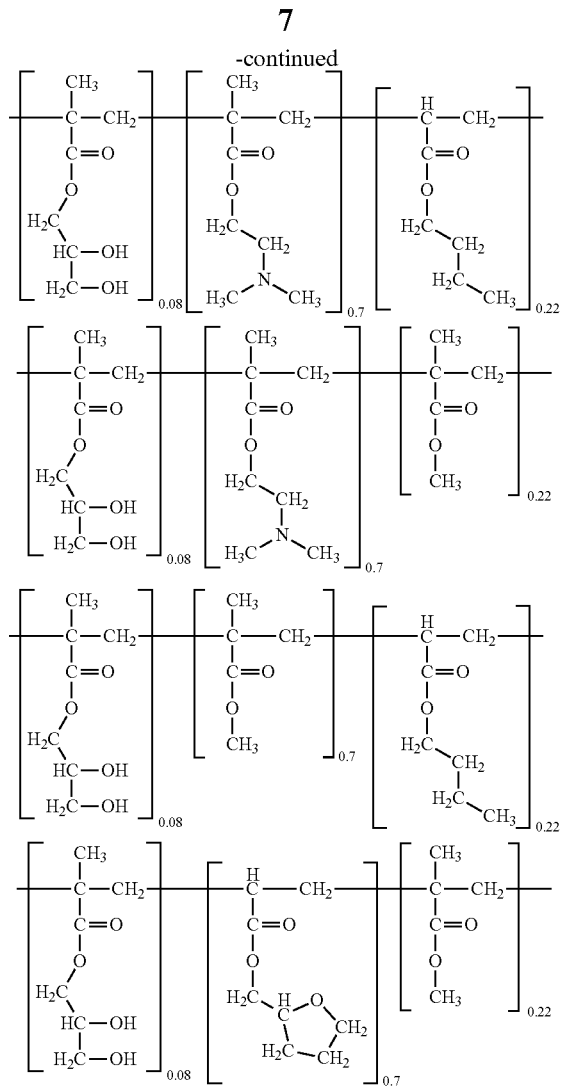

A further aspect of the present invention provides a method for self-healing of a urethane-acrylic copolymer prepared by crosslinking an acrylic copolymer represented by Formula 1:

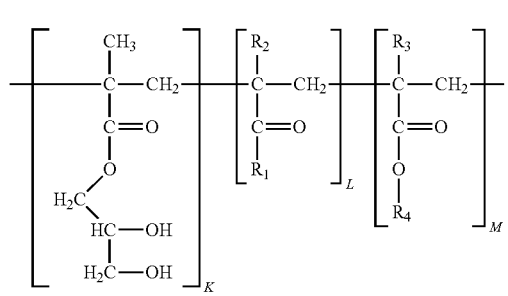

wherein $R_1$ is

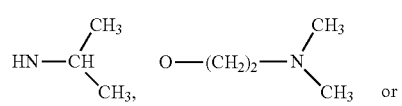

-continued $$O-(CH_2)_2-N\begin{matrix}H_2C-CH_3\\H_2C-CH_3\end{matrix},$$

$R_2$ and $R_3$ are each independently H or $CH_3$, $R_4$ is a methyl or butyl group, and K, L, and M representing the mole fractions of the corresponding repeating units are 0.08, 0.5 to 0.9, and 0.02 to 0.42, respectively, and satisfy the relation K+L+M=1, the method including adding water to the urethane-acrylic copolymer at a temperature below the lower critical solution temperature (LCST) of the urethane-acrylic copolymer and drying the wet copolymer.

One embodiment of the present invention provides a method for self-healing of a urethane-acrylic copolymer prepared from a copolymer represented by one of the following formulae:

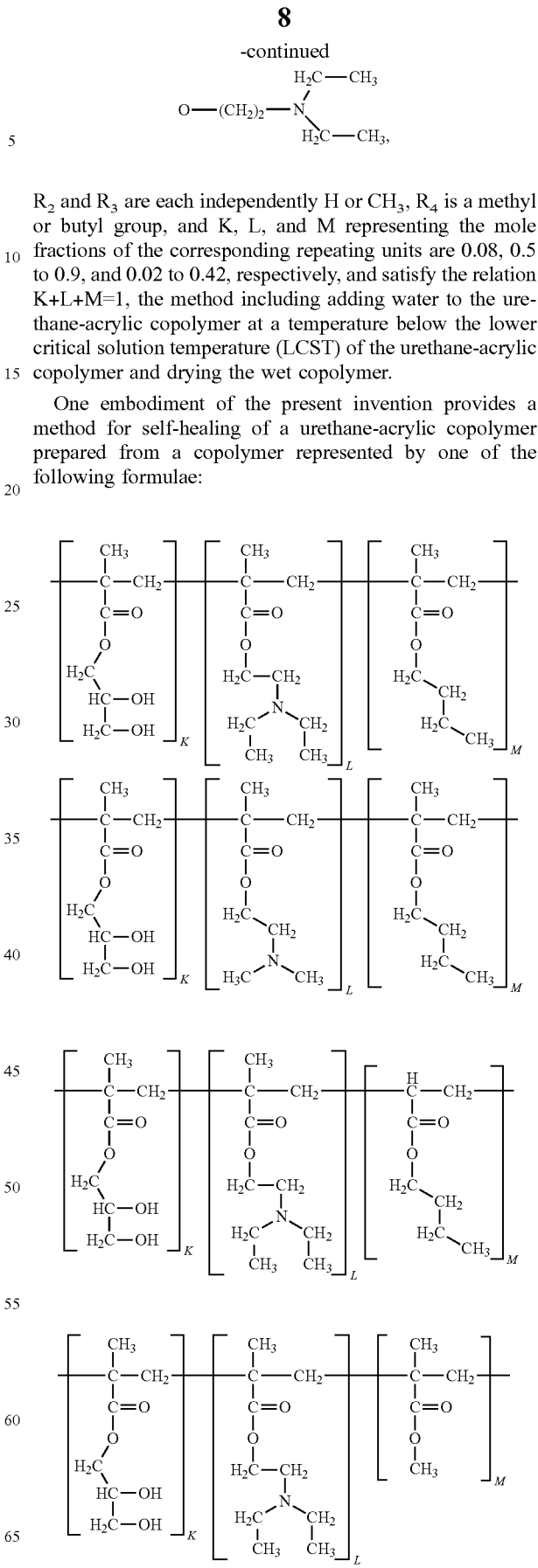

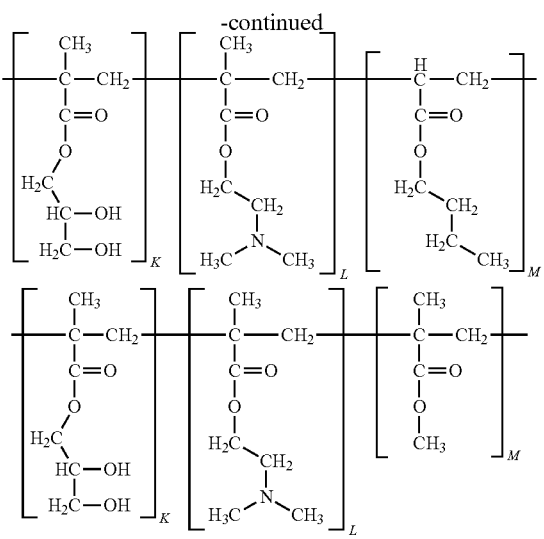

wherein K, L, and M representing the mole fractions of the corresponding repeating units are 0.08, 0.5 to 0.9, and 0.02 to 0.42, respectively, and satisfy the relation K+L+M=1.

Another aspect of the present invention provides a method for self-healing of a urethane-acrylic copolymer prepared by crosslinking the acrylic copolymer represented by Formula 1, the method including adding carbon dioxide-containing water to the urethane-acrylic copolymer at a temperature above the LCST of the urethane-acrylic copolymer and drying the wet copolymer.

The acrylic copolymer of the present invention can self-heal structural damages such as scratches with the aid of heat and water and possesses excellent physical properties at room temperature. The crosslinked copolymer of the present invention is prepared from the acrylic copolymer.

BRIEF DESCRIPTION OF THE DRAWINGS

The patent or application file contains a least one drawing executed in color. Copies of this patent or patent application publication with color drawing(s) will be provided by the Office upon request and payment of the necessary fee.

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
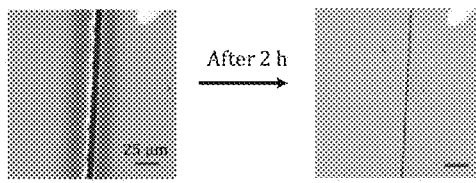
FIGS. 1 to 3 are photographs showing the self-healing capabilities of coatings produced in Examples 1-12 and Comparative Examples 1-5.
Figure 1:
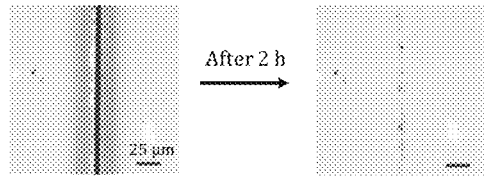
Figure 1:
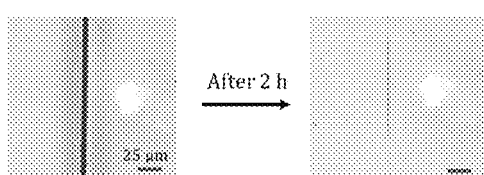
Figure 1:
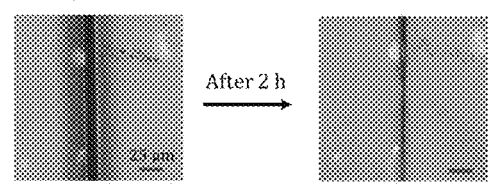
Figure 1:
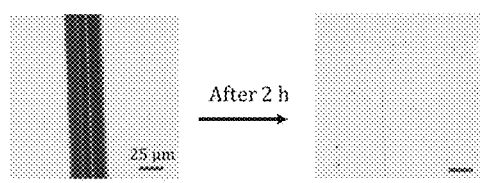
Figure 1:
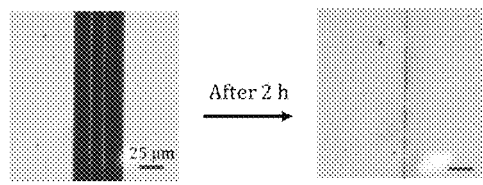
Figure 2:
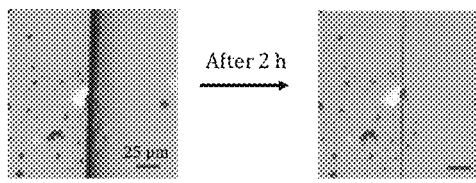
Figure 2:
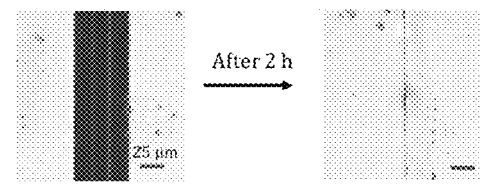
Figure 2:
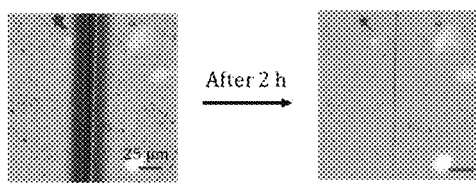
Figure 2:
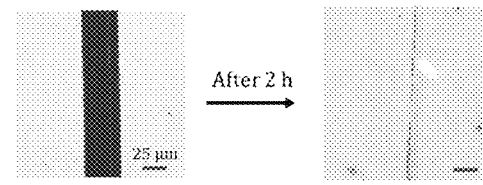
Figure 2:
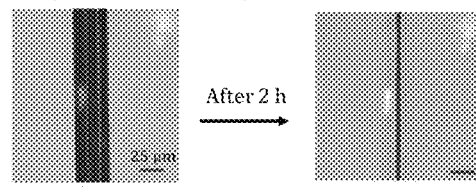
Figure 3:
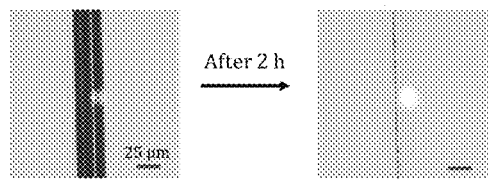
Figure 3:
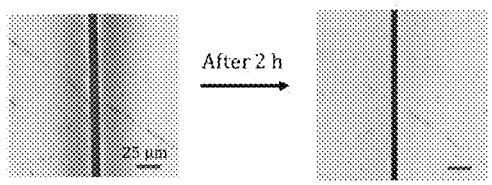
Figure 3:
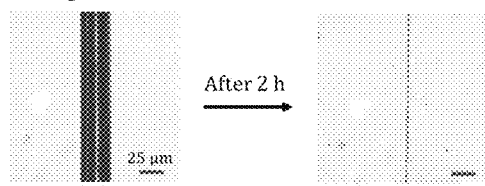
Figure 3:
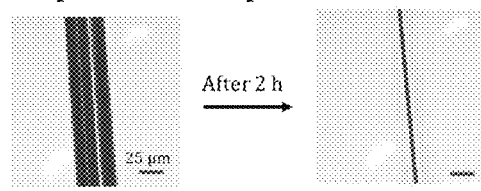
Figure 3:
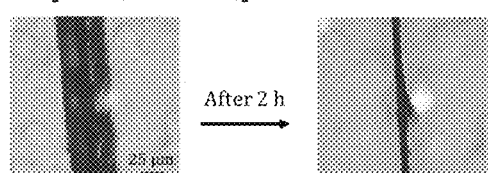
Figure 3:
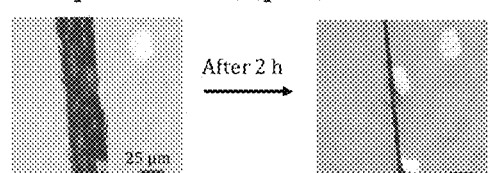
Figure 4A:
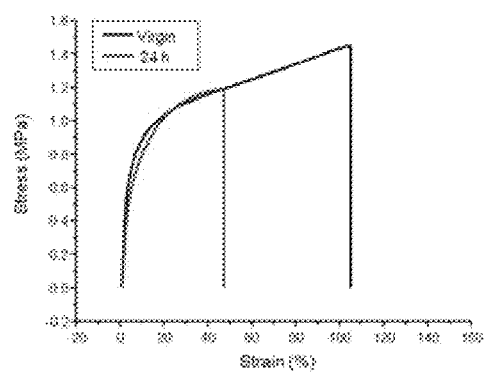
FIGS. 4a to 4g show tensile strengths of films produced in Examples 1-6 and Comparative Example 1.
Figure 4B:
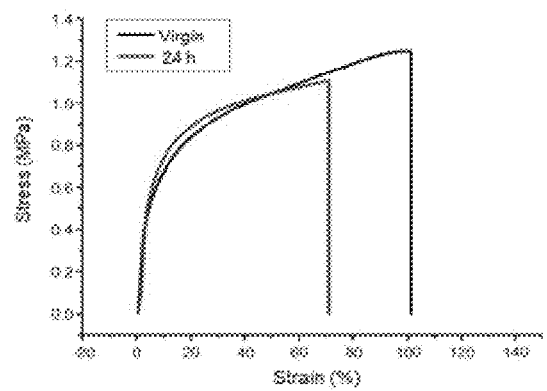
Figure 4C:
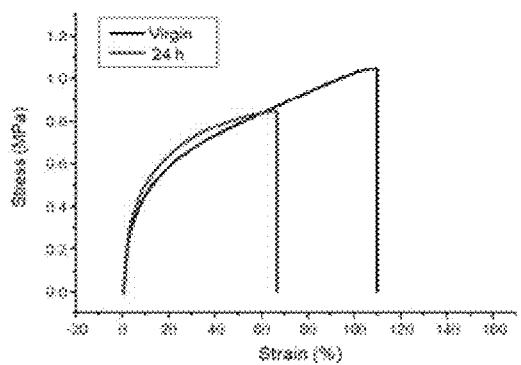
Figure 4D:
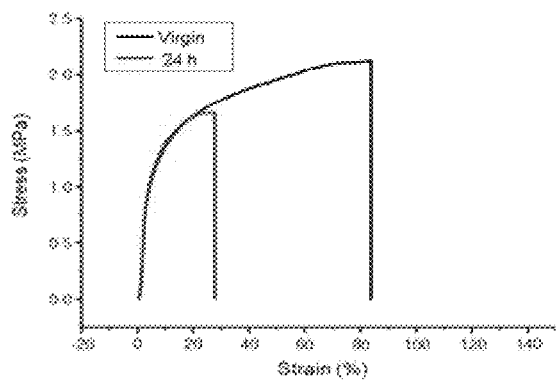
Figure 4E:
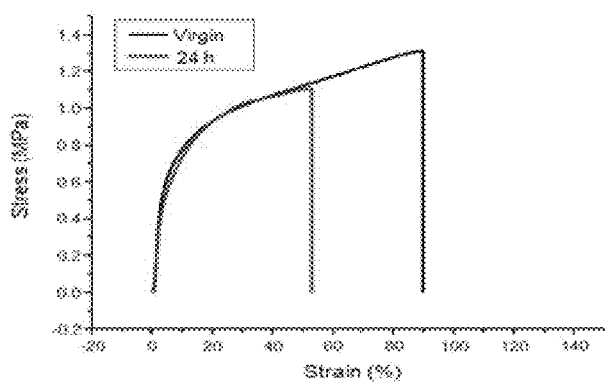
Figure 4F:
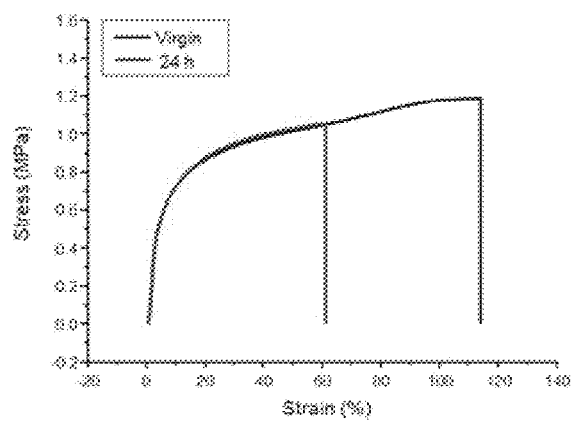
Figure 4G:
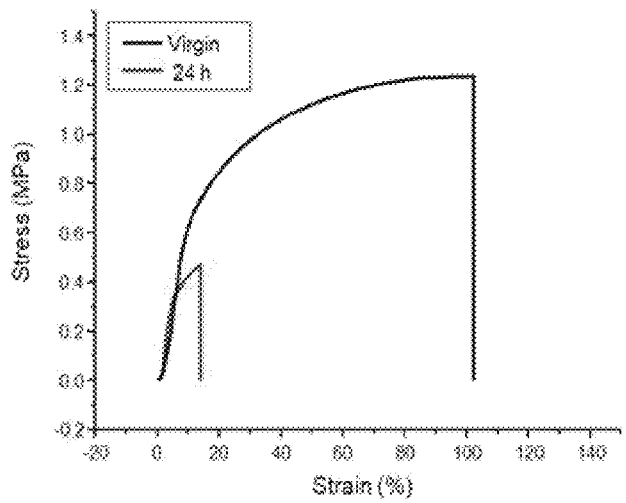

The present invention will now be described in more detail.

A self-healing acrylic random copolymer according to one embodiment of the present invention is prepared by free-radical polymerization. Specifically, the self-healing acrylic copolymer is obtained in a pure form by precipitation after solution polymerization. The copolymer has a molecular weight of about 12,000 to about 15,000 and its monomer ratio is confirmed by NMR spectroscopy.

The acrylic copolymer is crosslinked using a diisocyanate as a crosslinking agent. Specifically, the OH groups of the acrylic copolymer react with the NCO groups of the diisocyanate to urethane bonds. Dibutyltin dilaurate (DBTDL) may be added as a crosslinking catalyst. Glyceryl monoacrylate (GlyMA) may be used as a monomer for the preparation of the acrylic copolymer. In this case, the crosslinking agent is preferably added in such an amount that only one of the two hydroxyl groups of GlyMA participates in the crosslinking reaction. For example, the crosslinking agent may be added in such an amount that the ratio of the number of the hydroxyl groups of GlyMA to the number of the NCO groups of the diisocyanate is 2:1.

The acrylic copolymer is synthesized from three different monomers. The $T_g$ and LCST of the acrylic copolymer may vary depending on the contents of the monomers. The $T_g$ and LCST of the acrylic copolymer are factors determining the swelling and self-healing capability of the acrylic copolymer.

The first monomer is glyceryl monoacrylate (GlyMA). One of the primary OH groups of the monomer reacts with the crosslinking agent having NCO groups to form urethane groups. The amount of the first monomer is fixed to a particular mol % (e.g., 8 mol %) and the amounts of the other two monomers are adjusted to control the $T_g$ and LCST of the acrylic copolymer. GlyMA acts as a crosslinking point of the polymer and provides functional groups for self-healing.

For example, the second monomer may be diethylaminoethyl methacrylate (DEAEMA, hereinafter referred to simply as "DEA"), dimethylaminoethyl methacrylate (DMAEMA, hereinafter referred to simply as "DMA"), N-isopropylacrylamide (NIPAAm), methyl methacrylate or tetrahydrofurfuryl acrylate (THFA). Dimethylaminoethyl methacrylate (DMAEMA), diethylaminoethyl methacrylate (DEAEMA) or N-isopropylacrylamide (NIPAAm) may be used to control the LCST and glass transition temperature of the acrylic copolymer. The acrylic copolymer is hydrophilic at a temperature below its LCST and is hydrophobic at a temperature above its LCST.

For example, the third monomer may be methyl methacrylate (MMA), butyl methacrylate (BMA) or butyl acrylate (BA). The third monomer may be introduced to control the $T_g$ of the copolymer. As the length of the alkyl group of the third monomer increases, the $T_g$ of the copolymer decreases.

Another acrylic monomer constituting the polymer backbone may be used to control the glass transition temperature of the polymer or the mobility of the backbone. Examples of such acrylic monomers include butyl acrylate (BA) and methyl methacrylate (MMA).

Here, the glass transition temperature decreases or the mobility increases with increasing BA content. On the contrary, the glass transition temperature increases or the mobility decreases with increasing MMA content. When the mobility increases, the self-healing reaction of the polymer proceeds at a high rate, with the result that self-healing requires a short time to complete. On the contrary, when the mobility decreases, the self-healing reaction of the polymer proceeds at a low rate, with the result that self-healing requires a long time to complete.

Only BA and MMA are not necessarily used to impart such functions to the self-healing polymer. For this purpose, one or more radically or ionically polymerizable monomers can be optionally used. Examples of suitable polymerizable monomers include butadiene, ethylene, propylene, styrene, vinyl chloride, vinyl pyridine, vinyl acetate, methyl acrylate, acrylonitrile, maleic anhydride, ethyl acrylate, isoprene, acrylic acid, 2-hydroxyethyl methacrylate, and tetrafluoroethylene.

A second aspect of the present invention provides a self-healing crosslinked copolymer obtained by crosslinking the acrylic copolymer.

Only one of the two hydroxyl groups of the glyceryl structure participates in the crosslinking reaction. Dibutyltin dilaurate (DBTDL) as a catalyst can be added to crosslink the polymer. The catalyst is preferably designed to provide ligand structures capable of chelation.

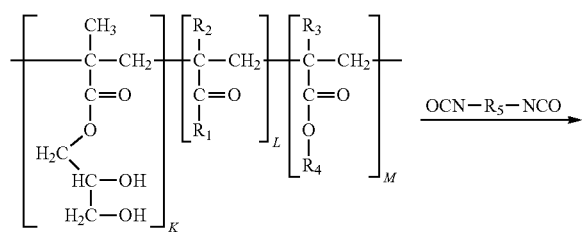

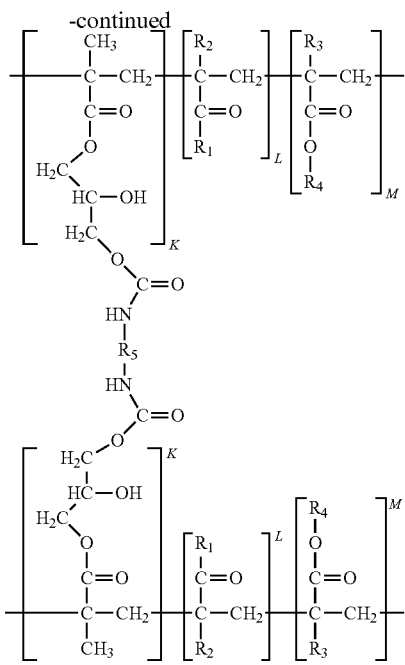

$R_5$: Hexamethylene, Isophorone

When the surface of the polymer in the form of a film or coating is scratched, the covalent bonds (e.g., C—C, C—O and C—N bonds) constituting the polymer backbone are cleaved to generate radicals. The radicals are stabilized by atmospheric air or moisture and can form functional groups such as —OH, —NH$_2$, and —CH$_3$. The catalyst DBTDL chelates with the ligands in the polymer at the scratched sites by atmospheric $H_2O$ and $CO_2$.

The chelated DBTDL has the ability to capture $CO_2$. Thus, unstable $CO_2$ forms carbonate or urethane covalent bonds with OH or NH$_2$ groups generated around or liberated from the scratches.

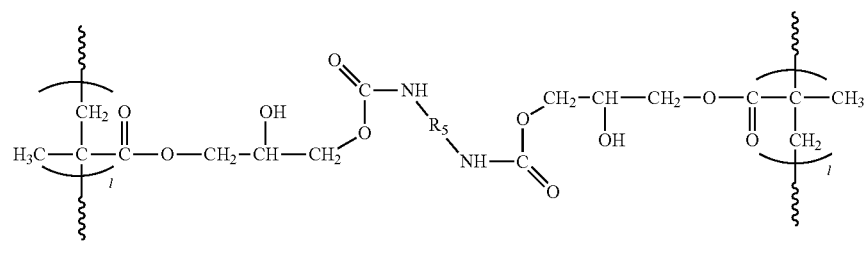

$H_2O$ and $CO_2$ | Dibutyltin dilaulate

-continued

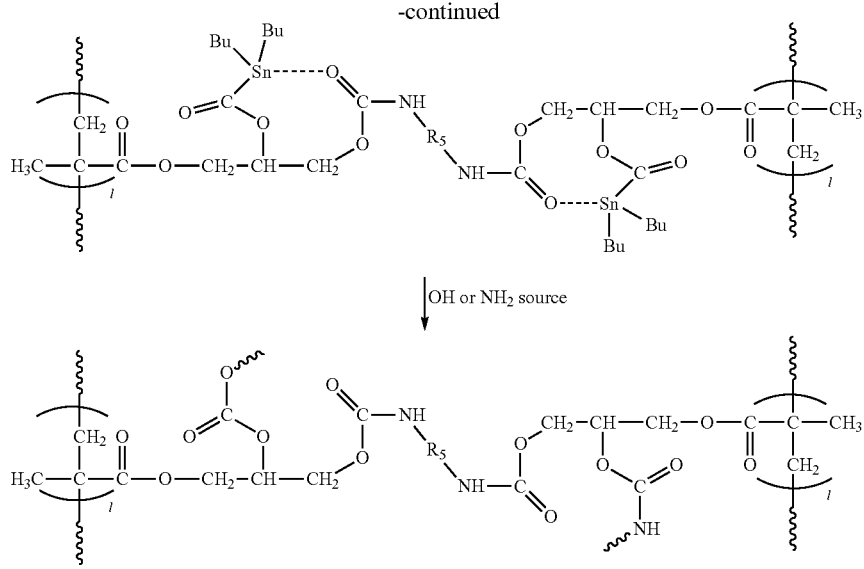

According to one embodiment of the present invention, the crosslinking agent may be isophorone diisocyanate (IPDI), hexamethylene diisocyanate (HDI), methylenebis(4-cyclohexylisocyanate) ($H_{12}MDI$), polymeric isocyanate or poly(diisocyanate), trimer or biuret of HDI or IPDI (isocyanurate), or poly(MDI).

2,2'-Azobisisobutyronitrile (AIBN) is typically used as a free-radical polymerization initiator. Other types of initiators may also be used. Examples of such initiators include: thermal initiators, such as potassium persulfate, ammonium persulfate, dioctyl peroxide, peroxy esters, dioctyl peroxydicarbonates, ketone peroxide, benzoyl peroxide, and t-butyl hydroperoxide; and photoinitiators, such as 2,2-dimethoxy-2-phenylacetophenone, benzophenone, and benzil dimethyl acetal.

The catalyst can be used to accelerate the reaction between the copolymer and the crosslinking agent. For example, the catalyst may be dibutyltin dilaurate (DBTDL). Examples of other catalysts include: organometallic catalysts, such as stannous octoate, dibutyltin diacetate, dibutyltin dimercaptide, zinc acetate, and bismuth octoate; and tertiary amine catalysts, such as triethylamine, 1,4-diazabicyclo[2,2,2]octane, trimethylaminoethylethanolamine, N-ethylmorpholine, dimethylcyclohexylamine, pentamethyldiethylenetriamine, and bis(2-dimethylaminoethyl)ether.

Butyl acetate and chloroform are used as dilution solvents to control reaction rate and viscosity during crosslinking. Solvents used for the synthesis of prepolymers can also be used. Examples of such solvents include acetone, methyl ethyl ketone, benzene, toluene, and xylene.

A third aspect of the present invention provides a self-healing coating including the crosslinked copolymer.

A chemical mechanism for self-healing of the polymer is important. Above all, the mobility of the polymer around scratches is important. Heating of a conventional self-healing polymer to a temperature above the glass transition temperature of the polymer is required to make the polymer thermally mobile. The heating of the polymer and the low $T_g$ of the polymer deteriorate the physical properties of the polymer. On the other hand, a self-healing polymer in the form of a hydrogel was proposed. Self-healing of the polymer is induced based on the diffusion or chemical reaction of the polymer in water. However, water remaining in the polymer causes poor mechanical properties of the polymer, limiting the commercialization of the polymer.

Figure 9:
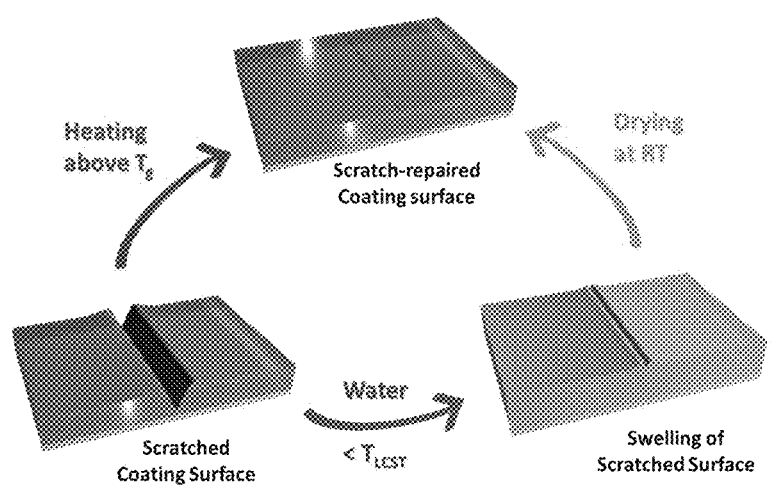
FIG. 9 is a diagram showing a method for scratch self-healing according to one embodiment of the present invention.

FIG. 9 is a diagram showing a method for scratch self-healing according to one embodiment of the present invention. Referring to FIG. 9, "LCST" characteristics are introduced for self-healing of the polymer by water-induced swelling at a low temperature below the LCST of the polymer. The polymer is also designed such that the polymer loses its affinity for water at room temperature (above the LCST), with the result that water is discharged and the original physical properties are restored. The use of carbonated water containing carbon dioxide can increase the LCST to extend the self-healing temperature region. Based on these characteristics, the water-absorbing polymer can self-heal scratches even below $T_g$ due to its mobility. In addition, the polymer maintains its original excellent physical properties above its LCST or at room temperature.

The urethane-acrylic copolymer of the present invention can self-heal by the addition of water below its LCST. Preferably, the pH of the water is adjusted to 4 to 7.

A further embodiment of the present invention provides a method for self-healing of the urethane-acrylic copolymer prepared by crosslinking the acrylic copolymer of Formula 1. Specifically, the method includes supplying carbon dioxide-containing water to the urethane-acrylic copolymer at a temperature above the LCST of the copolymer and drying the wet copolymer.

The temperature upon water addition for self-healing is preferably from 0 to 30° C. and is preferably lower than the LCST of the self-healing polymer. In the case where the self-healing temperature is higher than the LCST of the self-healing polymer, carbonated water containing carbon dioxide may be added instead of water. In this case, the self-healing temperature region can be extended to 0 to 70° C.

Therefore, the self-healing method of the present invention can be implemented in different forms by changing the kinds and contents of the monomers of the acrylic copolymer and the temperature and pH conditions for self-healing and depending on whether carbon dioxide is supplied.

The present invention will be explained in more detail with reference to the following examples and the accompanying drawings. It will be obvious to those skilled in the art that these examples are provided for illustrative purposes only and are not intended to limit the scope of the invention.

EXAMPLES

The following abbreviations are used for the compounds listed below.
GlyMA: Glyceryl monoacrylate
HEMA: Hydroxylethyl methacrylate
DEAEMA: Diethylaminoethyl methacrylate
DMAEMA: Dimethylaminoethyl methacrylate
BA: Butyl acrylate
BMA: Butyl methacrylate
MMA: Methyl methacrylate
THFA: Tetrahydrofurfuryl acrylate
PFOEA: 2-(Perfluorooctyl)ethyl acrylate
DdMA: Dodecyl methacrylate Preparative Example 1 (Example 1)

(1) Preparation of Self-Healing Acrylic Copolymer 2.56 g of glyceryl monoacrylate, 18.52 g of diethylaminoethyl methacrylate, and 11.94 g of butyl methacrylate were dissolved in 65.49 g of dioxane. To the solution was added 1.96 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.15 g of butyl acetate as a solvent. The solution was mixed with 0.13 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 2 (Example 2)

(1) Preparation of Self-Healing Acrylic Copolymer 2.56 g of glyceryl monoacrylate, 25.93 g of diethylaminoethyl methacrylate, and 6.25 g of butyl methacrylate were dissolved in 68.93 g of dioxane. To the solution was added 2.06 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.15 g of butyl acetate as a solvent. The solution was mixed with 0.12 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 3 (Example 3)

(1) Preparation of Self-Healing Acrylic Copolymer 2.56 g of glyceryl monoacrylate, 33.34 g of diethylaminoethyl methacrylate, and 0.56 g of butyl methacrylate were dissolved in 72.38 g of dioxane. To the solution was added 2.17 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.14 g of butyl acetate as a solvent. The solution was mixed with 0.11 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 4 (Example 4)

(1) Preparation of Self-Healing Acrylic Copolymer 2.56 g of glyceryl monoacrylate, 15.72 g of dimethylaminoethyl methacrylate, and 11.94 g of butyl methacrylate were dissolved in 59.87 g of dioxane. To the solution was added 1.79 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.16 g of butyl acetate as a solvent. The solution was mixed with 0.13 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 5 (Example 5)

(1) Preparation of Self-Healing Acrylic Copolymer 2.56 g of glyceryl monoacrylate, 25.15 g of dimethylaminoethyl methacrylate, and 3.41 g of butyl methacrylate were dissolved in 77.82 g of dioxane. To the solution was added 1.86 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.16 g of butyl acetate as a solvent. The solution was mixed with 0.13 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 6 (Example 6)

(1) Preparation of Self-Healing Acrylic Copolymer 2.56 g of glyceryl monoacrylate, 28.29 g of dimethylaminoethyl methacrylate, and 0.56 g of butyl methacrylate were dissolved in 78.57 g of dioxane. To the solution was added 1.88 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.16 g of butyl acetate as a solvent. The solution was mixed with 0.13 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 7 (Example 7)

(1) Preparation of Self-Healing Acrylic Copolymer 2.56 g of glyceryl monoacrylate, 25.93 g of diethylaminoethyl methacrylate, and 6.25 g of butyl acrylate were dissolved in 86.89 g of dioxane. To the solution was added 2.08 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.15 g of butyl acetate as a solvent. The solution was mixed with 0.12 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 8 (Example 8)

(1) Preparation of Self-Healing Acrylic Copolymer 2.56 g of glyceryl monoacrylate, 25.93 g of diethylaminoethyl methacrylate, and 4.40 g of methyl methacrylate were dissolved in 82.26 g of dioxane. To the solution was added 1.97 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.15 g of butyl acetate as a solvent. The solution was mixed with 0.12 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 9 (Example 9)

(1) Preparation of Self-Healing Acrylic Copolymer 2.56 g of glyceryl monoacrylate, 22.01 g of dimethylaminoethyl methacrylate, and 6.25 g of butyl acrylate were dissolved in 77.07 g of dioxane. To the solution was added 1.84 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.16 g of butyl acetate as a solvent. The solution was mixed with 0.13 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 10 (Example 10)

(1) Preparation of Self-Healing Acrylic Copolymer 2.56 g of glyceryl monoacrylate, 22.01 g of dimethylaminoethyl methacrylate, and 4.40 g of methyl methacrylate were dissolved in 72.44 g of dioxane. To the solution was added 1.74 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.17 g of butyl acetate as a solvent. The solution was mixed with 0.14 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 11 (Comparative Example 1)

(1) Preparation of Acrylate Polymer 2.08 g of hydroxyl ethyl methacrylate (HEMA), 22.00 g of dimethylaminoethyl methacrylate, and 6.25 g of butyl methacrylate were dissolved in 60.06 g of dioxane. To the solution was added 1.82 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.19 g of butyl acetate as a solvent. The solution was mixed with 0.13 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 12 (Example 11)

(1) Preparation of Acrylate Polymer 2.56 g of glyceryl monoacrylate, 14.02 g of methyl methacrylate (MMA), and 5.63 g of butyl acrylate were dissolved in 44.43 g of dioxane. To the solution was added 1.33 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.24 g of butyl acetate as a solvent. The solution was mixed with 0.18 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 13 (Comparative Example 2)

(1) Preparation of Acrylate Polymer 2.08 g of hydroxyl ethyl methacrylate (HEMA), 14.02 g of methyl methacrylate (MMA), and 5.63 g of butyl acrylate were dissolved in 43.47 g of dioxane. To the solution was added 1.33 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.24 g of butyl acetate as a solvent. The solution was mixed with 0.18 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 14 (Example 12)

(1) Preparation of Acrylate Polymer 2.56 g of glyceryl monoacrylate, 4.40 g of methyl methacrylate (MMA), and 21.86 g of tetrahydrofurfuryl acrylate (THFA) were dissolved in 57.67 g of dioxane. To the solution was added 1.73 g of AIBN as a thermal initiator. After purging with nitrogen for 30 min, the mixture was allowed to react in an oil bath at 70° C. for ~4 h. The reaction was quenched by cooling. The reaction mixture was precipitated in excess ether to obtain an acrylic copolymer.

(2) Production of Self-Healing Coating 3 g of the acrylic copolymer was dissolved in 3.20 g of butyl acetate as a solvent. The solution was mixed with 0.14 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 15 (Comparative Example 3)

(1) Preparation of Acrylate Polymer 2.08 g of hydroxyl ethyl methacrylate (HEMA), 4.40 g of methyl methacrylate (MMA), and 21.86 g of tetrahydrofurfuryl acrylate (THFA) were dissolved in 57.67 g of dioxane. To the solution was added 1.73 g of AIBN as a thermal initiator. After purging with nitrogen for 30 min, the mixture was allowed to react in an oil bath at 70° C. for ~4 h. The reaction was quenched by cooling. The reaction mixture was precipitated in excess ether to obtain an acrylic copolymer.

(2) Production of Self-Healing Coating 3 g of the acrylic copolymer was dissolved in 3.20 g of butyl acetate as a solvent. The solution was mixed with 0.14 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 16 (Comparative Example 4)

(1) Preparation of Acrylate Polymer 0.64 g of glyceryl monoacrylate, 14.63 g of 2-(perfluorooctyl)ethyl acrylate, and 2.79 g of dodecyl methacrylate were dissolved in 36.14 g of dimethyl formamide (DMF). To the solution was added 1.08 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.11 g of butyl acetate as a solvent. The solution was mixed with 0.06 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 17 (Comparative Example 5)

(1) Preparation of Acrylate Polymer 0.52 g of hydroxyl ethyl methacrylate (HEMA), 14.63 g of 2-(perfluorooctyl)ethyl acrylate, and 2.79 g of dodecyl methacrylate were dissolved in 36.14 g of dimethyl formamide (DMF). To the solution was added 1.08 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Coating 3 g of the acrylic copolymer was dissolved in 3.11 g of butyl acetate as a solvent. The solution was mixed with 0.05 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

The molar proportions of the monomers used for the preparation of the copolymers in Examples 1-12 and Comparative Examples 1-5 are summarized in Tables 1 to 5.

TABLE 1 unit: mol %

| Name | GlyMA | DEAEMA | DMAEMA | BA | BMA | MMA |
|---|---|---|---|---|---|---|
| Example 1 | 8 | 50 | — | — | 42 | — |
| Example 2 | 8 | 70 | — | — | 22 | — |
| Example 3 | 8 | 90 | — | — | 2 | — |
| Example 4 | 8 | — | 50 | — | 42 | — |
| Example 5 | 8 | — | 70 | — | 22 | — |
| Example 6 | 8 | — | 90 | — | 2 | — |
| Example 7 | 8 | 70 | — | 22 | — | — |
| Example 8 | 8 | 70 | — | — | — | 22 |
| Example 9 | 8 | — | 70 | 22 | — | — |
| Example 10 | 8 | — | 70 | — | — | 22 |

TABLE 2 unit: mol %

| Name | HEMA | DMAEMA | BMA |
|---|---|---|---|
| Comparative Example 1 | 8 | 70 | 22 |

TABLE 3 unit: mol %

| Name | GlyMA | HEMA | MMA | BA |
|---|---|---|---|---|
| Example 11 | 8 | — | 70 | 22 |
| Comparative Example 2 | — | 8 | 70 | 22 |

TABLE 4 unit: mol %

| Name | GlyMA | HEMA | THFA | MMA |
|---|---|---|---|---|
| Example 12 | 8 | — | 70 | 22 |
| Comparative Example 3 | — | 8 | 70 | 22 |

TABLE 5 unit: mol %

| Name | GlyMA | HEMA | PFOEA | DdMA |
|---|---|---|---|---|
| Comparative Example 4 | 8 | — | 70 | 22 |
| Comparative Example 5 | — | 8 | 70 | 22 |

Evaluation of Self-Healing Properties and Results
Scratch Self-Healing Test

A scratch self-healing test was conducted by the following procedure. First, a 40-50 μm thick coating was scratched to a width of 10-25 μm with a scalpel. A change of the scratch was observed with time. Healing was allowed to proceed at a temperature above $T_g$. The scratched coating was allowed to stand in air under ambient conditions. Another coating was scratched and allowed to stand in a bombe through which nitrogen was circulated. A sample obtained by crosslinking the polymer without DBTDL was observed at a temperature above $T_g$ in air.

As a result, the presence of GlyMA enabled self-healing and the presence of HEMA impeded self-healing. Self-healing required $CO_2$ and $H_2O$ and no self-healing was observed under nitrogen conditions. Self-healing was not observed in the absence of DBTDL.

The GlyMA-containing crosslinked urethane acrylate coatings of Examples 1-10 self-healed the scratches. The HEMA-containing coating of Comparative Example 1 self-healed the scratch. Self-healing was observed at temperatures above the $T_g$ values. In the coating of Comparative Example 1, the width of the scratch was reduced to some extent by heating and elasticity but no complete scratch closure was observed. The coatings of Examples 11 and 12 are distinguished from those of Comparative Examples 2 and 3, respectively. GlyMA was present as a crosslinking point in the coatings of Examples 11 and 12 and HEMA was present as a crosslinking point in the coatings of Comparative Examples 2 and 3. The coatings containing HEMA had no self-healing capability.

Self-healing was not observed in the coatings of Comparative Examples 4 and 5 irrespective of whether the crosslinking point was GlyMA or HEMA. This is believed to be because the very high molecular weights of the other monomers PFOEMA and DdMA lead to a relatively very small weight proportion of GlyMA or HEMA, limiting the self-healing of the coatings. Further, the surface and physical properties of the coatings including the copolymers synthesized using such monomers were found to deteriorate, unlike those of the coatings including the copolymers synthesized using the acrylate monomers having low molecular weights.

The self-healing efficiency of each coating was calculated by the following equation:

$$\text{Self-healing efficiency (\%)} = \frac{\text{Width of scratch} - \text{Width after healing}}{\text{Width of scratch}} \times 100$$

The coating is considered to have self-healing capability when its healing efficiency is 85% or above. All healing efficiencies were measured under atmospheric conditions at temperatures above the respective $T_g$ values.

The self-healing efficiencies determined through the scratch self-healing test are summarized in Table 6.

Tensile Test and Results

The tensile strengths of the self-healing polymers were measured to compare and analyze the self-healing properties of the polymers. To this end, polymer specimens were constructed to have a width of 6 mm, a length of 50 mm, and a thickness of 2 mm. The tensile strength of each specimen was measured on a Universal testing machine (MCT-1150, AND, Japan). Then, the specimen was divided into two by completely cutting the middle portion thereof with a razor blade. The two divided portions were placed such that the cross sections were in contact with each other, and were then gently compressed for 1 min. After standing in air above the $T_g$, the tensile strength was measured every hour.

FIGS. 4a to 4g show the measured tensile strengths of the polymers prepared in Examples 1-6 and Comparative Example 1. Referring to FIGS. 4a to 4g, the polymers of Examples 1-6 had self-healing capabilities after 24 h whereas the polymer of Comparative Example 1 had no self-healing capability after 24 h.

ATR FT-IR Spectroscopy Results

Each polymer was crosslinked in the presence of 5 wt % of DBTDL. The crosslinking catalyst was used in an amount of 5 wt % to facilitate a peak shift on IR. Chloroform was used as a crosslinking solvent. The polymer solution was cured on a release paper in an oven at 100° C. for 12 h and the solvent was removed by evaporation to form a film.

After the polymer film was cut with a razor blade, the cut cross section of the film was measured by FR-IR spectroscopy in the ATR mode. A peak shift was observed in the cross section of the scratch within 1 min and 60 min after cutting to determine whether the film had a self-healing capability. The cut polymer film was left standing in air above the $T_g$ of the polymer (FT-IR was difficult to observe below the $T_g$). The peak shift was observed around 1558 cm$^{-1}$ when DBTDL was chelated with the ligands of the polymer by water and carbon dioxide in air.

Figure 5:
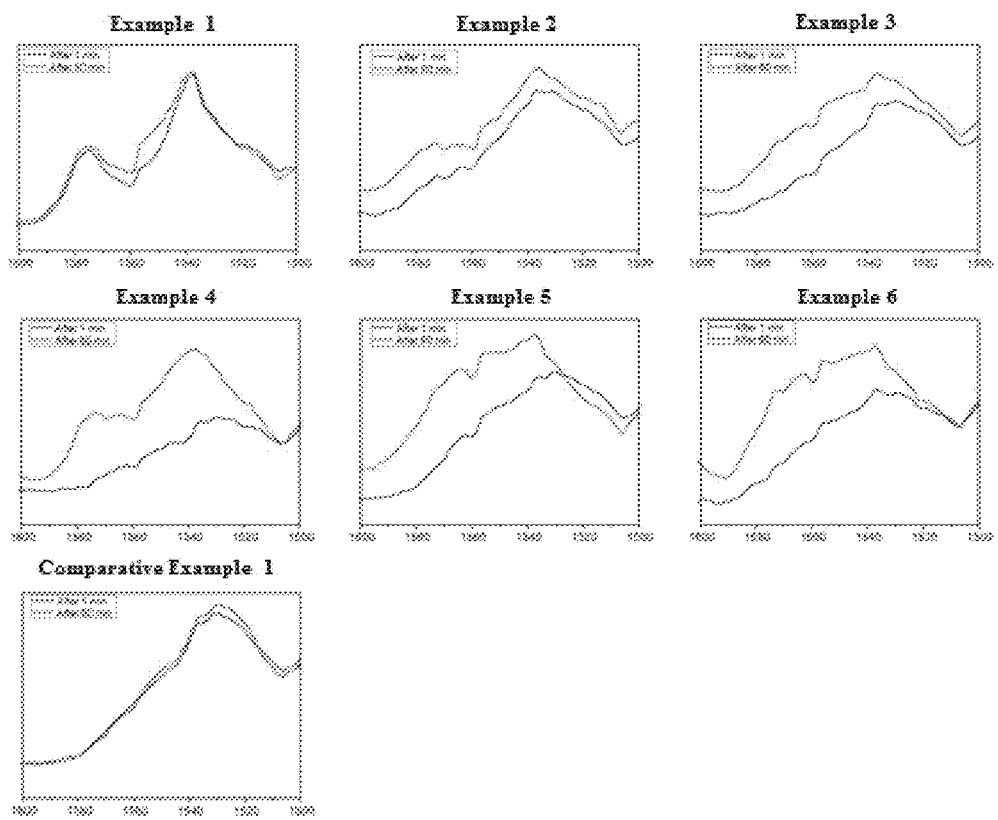
FIGS. 5 to 7 show FT-IR spectra of films produced in Examples 1-12 and Comparative Examples 1-5.
Figure 6:
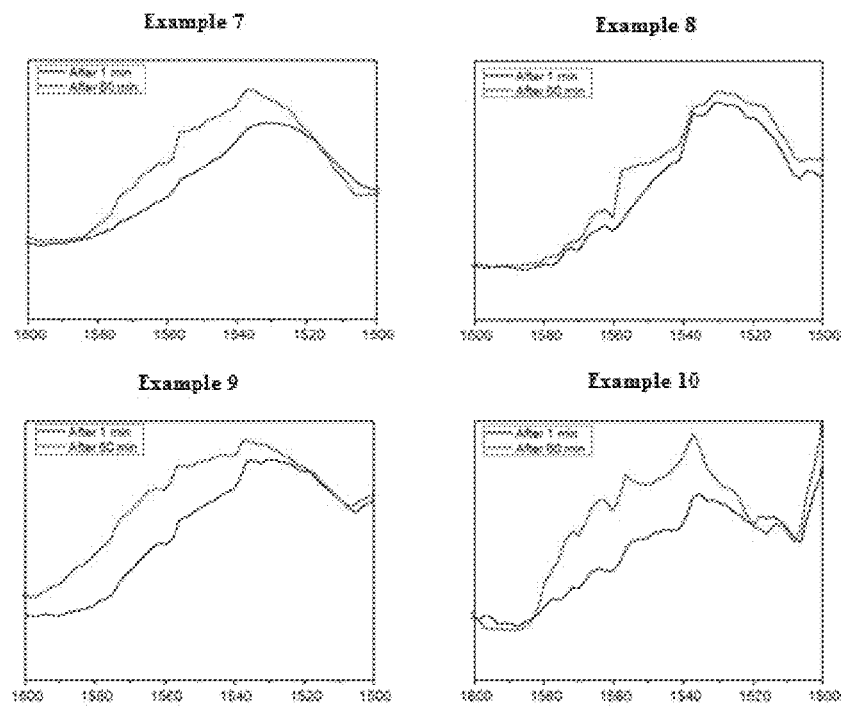
Figure 7:
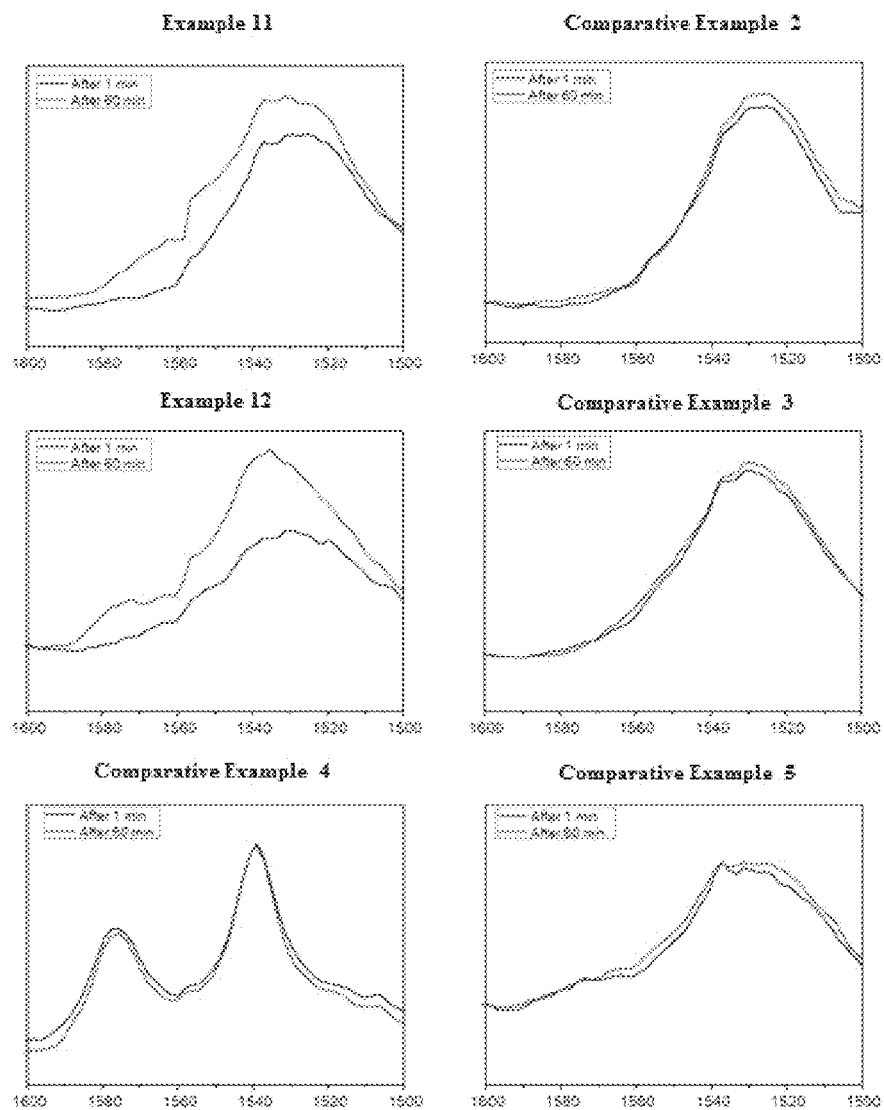
Figure 8:
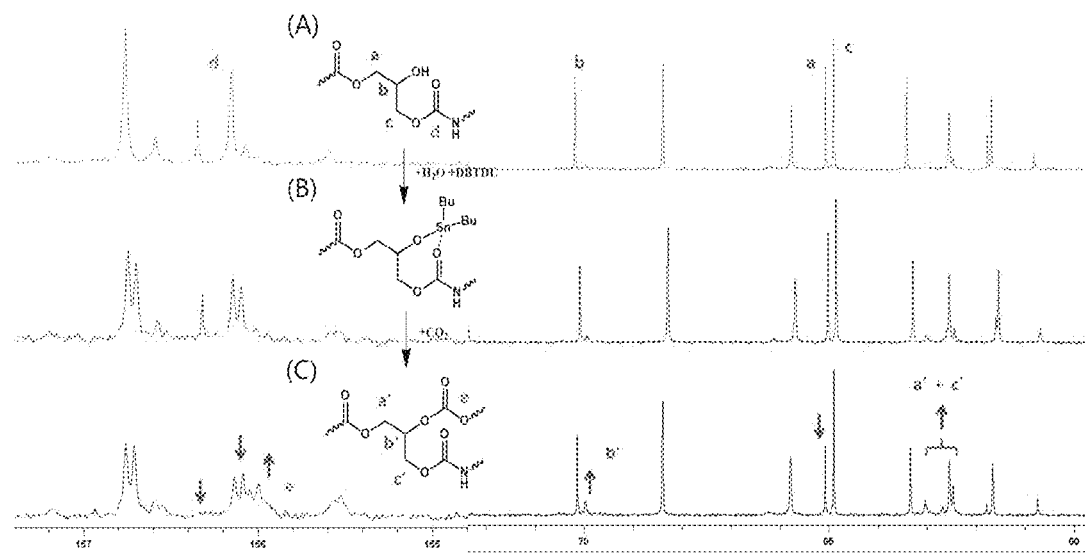
FIG. 8 shows $^{13}$C-NMR spectra of an acrylic copolymer according to one embodiment of the present invention and a urethane-acrylic copolymer prepared by crosslinking the acrylic copolymer.

FIGS. 5 to 8 show FT-IR spectra of the films produced in Examples 1-12 and Comparative Examples 1-5. Referring to FIGS. 5 to 7, higher peaks were observed around 1558 cm$^{-1}$ in the films of Examples 1-10 immediately after 1 h. These peaks were similar to that of the film of Comparative Example 1. Higher peaks were observed around 1558 cm$^{-1}$ in the films of Examples 11 and 12 immediately after 1 h. These peaks were similar to those of the films of Comparative Examples 2-5. No peak shift was observed around 1558 cm$^{-1}$ in the film of Comparative Example 4 despite the presence of GlyMA in the film. This result appears to be because the weight proportion of GlyMA in the polymer is very small, making it difficult to observe peaks.

The FT-IR spectroscopy results are summarized in Table 7.

TABLE 6 unit: %

| Example 1 | Example 2 | Example 3 | Example 4 | Example 5 | Example 6 |
|---|---|---|---|---|---|
| 86 | 100 | 100 | 85 | 100 | 98 |

| Example 7 | Example 8 | Example 9 | Example 10 | — | Comparative Example 1 |
|---|---|---|---|---|---|
| 99 | 96 | 100 | 97 | — | 67 |

| Example 11 | Comparative Example 2 | Example 12 | Comparative Example 3 | Comparative Example 4 | Comparative Example 5 |
|---|---|---|---|---|---|
| 99 | 44 | 99 | 72 | 54 | 62 |

TABLE 7

| Example 1 | Example 2 | Example 3 | Example 4 | Example 5 | Example 6 |
|---|---|---|---|---|---|
| ○ | ○ | ○ | ○ | ○ | ○ |

| Example 7 | Example 8 | Example 9 | Example 10 | — | Comparative Example 1 |
|---|---|---|---|---|---|
| ○ | ○ | ○ | ○ | — | x |

| Example 11 | Comparative Example 2 | Example 12 | Comparative Example 3 | Comparative Example 4 | Comparative Example 5 |
|---|---|---|---|---|---|
| ○ | x | ○ | x | x | x |

Referring to Table 7, the films of Examples 1-12 showed satisfactory self-healing results but the films of Comparative Examples 1-5 showed unsatisfactory self-healing results.

Preparative Example 18 (DMA90-DMA50)

(1) Preparation of Self-Healing Acrylic Copolymer Prepolymers

GlyMA, DMAEMA, and BMA as monomers, dioxane as a solvent, and AIBN as a thermal initiator were put into a 250 mL round-bottom flask. The amounts of the monomers, the solvent, and the thermal initiator are shown in Table 8. The mixture was stirred. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

TABLE 8

Compositions of acrylic copolymer prepolymers DMA90-DMA50 (unit: g)

| Name | Monomer | | | AIBN | Dioxane |
|---|---|---|---|---|---|
| | GlyMA | DMAEMA | BMA | (Initiator) | (Solvent) |
| DMA90 | 1.28 | 14.14 | 0.28 | 0.94 | 31.42 |
| DMA80 | 1.28 | 12.57 | 1.70 | 0.93 | 31.12 |
| DMA70 | 1.28 | 11.00 | 3.12 | 0.92 | 30.82 |
| DMA60 | 1.28 | 9.43 | 4.55 | 0.91 | 30.52 |
| DMA50 | 1.28 | 7.86 | 5.97 | 0.90 | 30.22 |

The numbers in Table 8 indicate the contents (mol %) of the DMAEMA monomers.

(2) Production of Self-Healing Urethane-Acrylic Coatings 3 g of each acrylic copolymer was dissolved in butyl acetate as a solvent. To the solution were added appropriate amounts of hexamethylene diisocyanate and DBTDL. The amounts of the solvent, the crosslinking agent, and the crosslinking catalyst are shown in Table 9. The mixture was coated on a base coating of a steel sheet using a bar coater (number: 36). The resulting coating was cured in an oven at 150° C. for 20 min and taken out of the oven.

TABLE 9

Compositions for crosslinking DMA90-DMA50 (unit: g)

| Name | Prepolymer | HDI | DBTDL | Butyl acetate |
|---|---|---|---|---|
| DMA90 | 3 | 0.128 | 0.03 | 3.19 |
| DMA80 | 3 | 0.129 | 0.03 | 3.19 |
| DMA70 | 3 | 0.130 | 0.03 | 3.19 |
| DMA60 | 3 | 0.132 | 0.03 | 3.19 |
| DMA50 | 3 | 0.133 | 0.03 | 3.19 |

Preparative Example 19 (DMA70-HEMA and DMA60-HEMA)

(1) Preparation of Non-Self-Healing Acrylic Copolymer Prepolymers for Comparison HEMA, DMAEMA, and BMA as monomers, dioxane as a solvent, and AIBN as a thermal initiator were put into a 250 mL round-bottom flask. The amounts of the monomers, the solvent, and the thermal initiator are shown in Table 10. The mixture was stirred. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

TABLE 10

Compositions of acrylic copolymer prepolymers DMA90-HEMA and DMA60-HEMA (unit: g)

| Name | Monomer | | | AIBN | Dioxane |
|---|---|---|---|---|---|
| | HEMA | DMAEMA | BMA | (Initiator) | (Solvent) |
| DMA70-HEMA | 1.04 | 11.004 | 3.12 | 0.91 | 30.34 |
| DMA60__HEMA | 1.04 | 9.43 | 4.55 | 0.90 | 30.04 |

(2) Production of Non-Self-Healing Urethane-Acrylic Coatings for Comparison 3 g of each acrylic copolymer was dissolved in butyl acetate as a solvent. To the solution were added appropriate amounts of hexamethylene diisocyanate and DBTDL. The amounts of the solvent, the crosslinking agent, and the crosslinking catalyst are shown in Table 11. The mixture was coated on a base coating of a steel sheet using a bar coater (number: 36). The resulting coating was cured in an oven at 150° C. for 20 min and taken out of the oven.

TABLE 11

Compositions for crosslinking DMA70-HEMA and DMA60-HEMA (unit: g)

| Name | Prepolymer | HDI | DBTDL | Butyl acetate |
|---|---|---|---|---|
| DMA70-HEMA | 3 | 0.13 | 0.03 | 3.19 |
| DMA60__HEMA | 3 | 0.13 | 0.03 | 3.19 |

Preparative Example 20 (DEA80)

(1) Preparation of Self-Healing Acrylic Copolymer Prepolymer 1.28 g of GlyMA, 14.82 g of DEAEMA, and 1.70 g of BMA were dissolved in 35.61 g of dioxane. To the solution was added 1.06 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Self-Healing Urethane-Acrylic Coating 3 g of the acrylic copolymer was dissolved in 3.17 g of butyl acetate as a solvent. To the solution were added 0.11 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 21 (NI80)

(1) Preparation of Self-Healing Acrylic Copolymer Prepolymer 1.28 g of GlyMA, 9.05 g of NIPAAm, and 1.53 g of BMA were dissolved in 35.61 g of dioxane. To the solution was added 0.71 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Non-Self-Healing Urethane-Acrylic Coating for Comparison 3 g of the acrylic copolymer was dissolved in 3.23 g of dioxane as a solvent. The solution was mixed with 0.17 g of hexamethylene diisocyanate and 0.03 g of DBTDL. The mixture was coated on a base coating of a steel sheet using a bar coater (number: 36). The resulting coating was cured in an oven at 100° C. for 1 h and taken out of the oven.

Preparative Example 22 (NI60)

(1) Preparation of Non-Self-Healing Acrylic Copolymer Prepolymer for Comparison 1.28 g of GlyMA, 6.78 g of NIPAAm, and 4.10 g of BMA were dissolved in 36.51 g of dioxane. To the solution was added 0.73 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Non-Self-Healing Urethane-Acrylic Coating for Comparison 3 g of the acrylic copolymer was dissolved in 3.23 g of dioxane as a solvent. The solution was mixed with 0.16 g of hexamethylene diisocyanate and 0.03 g of DBTDL. The mixture was coated on a base coating of a steel sheet using a bar coater (number: 36). The resulting coating was cured in an oven at 100° C. for 1 h and taken out of the oven.

Preparative Example 23 (GMB)

(1) Preparation of Non-Self-Healing Acrylic Copolymer Prepolymer for Comparison 1.28 g of GlyMA, 7.00 g of MMA, and 2.82 g of BA were dissolved in 22.21 g of dioxane. To the solution was added 0.66 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Non-Self-Healing Urethane-Acrylic Coating for Comparison 3 g of the acrylic copolymer was dissolved in 3.24 g of butyl acetate as a solvent. The solution was mixed with 0.18 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Preparative Example 24 (HFB)

(1) Preparation of Non-Self-Healing Acrylic Copolymer Prepolymer for Comparison 1.04 g of GlyMA, 11.76 g of TFEMA, and 2.81 g of BA were dissolved in 31.25 g of N,N-dimethylformamide. To the solution was added 0.93 g of AIBN as a thermal initiator. After purging with nitrogen for 30 min, the mixture was allowed to react in an oil bath at 70° C. for ~4 h. The reaction was quenched by cooling. The reaction mixture was precipitated in excess hexane to obtain an acrylic copolymer.

(2) Production of Non-Self-Healing Urethane-Acrylic Coating for Comparison 3 g of the acrylic copolymer was dissolved in 3.19 g of butyl acetate as a solvent. The solution was mixed with 0.13 g of hexamethylene diisocyanate and 0.03 g of DBTDL. The mixture was coated on a base coating of a steel sheet using a bar coater (number: 36). The resulting coating was cured in an oven at 150° C. for 20 min and taken out of the oven.

Evaluation of Self-Healing Properties and Results

Scratch Self-Healing Test

The $T_g$ and LCST of each of the self-healing polymers were measured to determine the thermal properties and self-healing temperature region of the polymer.

The $T_g$ of the urethane-acrylic copolymer was measured using a differential scanning calorimeter (DSC2910, TAInstruments, USA). For $T_g$ measurement, 2-3 cycles were repeated while heating at a rate of 10° C./min from −50 to 150° C.

The LCST of the acrylic copolymer before crosslinking was measured by the following procedure. 1 wt % of the acrylic copolymer was dissolved in water at 3° C. whose pH varies depending on $CO_2$ content. Transmittances at different temperatures were measured at a wavelength of 600 nm using a UV-vis spectrophotometer (UV-1650PC, Shimadzu, Japan). The temperature corresponding to the onset of the decrease in transmittance was defined as "LCST". Changes in the light transmittance of the solutions containing 1 wt % of the acrylic copolymer (in water and carbonated water) in ethanol circulating thermostatic baths and water circulating thermostatic baths were observed with increasing temperature at a rate of 2° C. every 20 minutes.

The self-healing properties of the acrylic copolymers were investigated based on the LCST characteristics below the $T_g$ values of the copolymers. The acrylic copolymers were crosslinked in the form of coatings or films by urethane crosslinking reactions. The thicknesses of the coatings were adjusted to 40-45 m for scratch healing measurement. The thicknesses of the films were adjusted to 2±0.2 mm for swelling (%), $T_g$, and tensile strength measurements.

The hydroxyl groups of the GlyMA and HEMA monomers were used as functional groups crosslinkable by urethane reaction. For GlyMA, only one of the primary hydroxyl groups participated in the reaction. The contents of GlyMA and HEMA acting as crosslinking points in the polymers were maintained constant at 8 mol %. GlyMA provides ligand sites capable of chelating DBTDL as a catalyst. The ligand sites form carbonate or urethane groups with $CO_2$ and $H_2O$, enabling self-healing of the polymers. Therefore, so long as the polymers synthesized using GlyMA are mobile at scratched sites and the polymer chains can diffuse and come into contact with each other, they can self-heal the scratches through substantially new chemical bonds or reactions. In contrast, the polymers synthesized using HEMA do not involve substantially new chemical bonds or reactions.

The LCST values of the copolymers synthesized using the DMAEMA, DEAEMA and NIPAAm monomers with LCST characteristics may vary depending on the monomer contents. The addition of hydrophobic monomers (e.g., BMA, BA, and MMA) to the monomers with LCST characteristics lowers the LCST values of the corresponding polymers. The addition of hydrophilic monomers (e.g., GlyMA and HEMA) to the monomers with LCST characteristics increases the LCST values of the corresponding polymers. Based on these features, desired LCST ranges can be designed.

To show characteristics and self-healing properties based on the relationship between $T_g$ and LCST, the polymers containing different amounts of DMAEMA were selected. The $T_g$ and LCST values and the self-healing capabilities of the polymers synthesized using 50-90 mol % of DMAEMA were determined by the DMAEMA content. To show self-healing properties depending on DEAEMA and NIPAAm, DEA80 and NI80 were synthesized using DEAEMA and NIPAAm, respectively.

TABLE 12

Compositions of the monomers of the self-healing acrylic copolymer prepolymers (unit: mol %)

| Name | GlyMA | DMAEMA | DEAEMA | NIPAAm | BMA | BA |
|------|-------|--------|--------|--------|-----|-----|
| DMA90 | 8 | 90 | — | — | 2 | — |
| DMA80 | 8 | 80 | — | — | 12 | — |
| DMA70 | 8 | 70 | — | — | 22 | — |
| DMA60 | 8 | 60 | — | — | 32 | — |
| DMA50 | 8 | 50 | — | — | 42 | — |
| DEA80 | 8 | — | 80 | — | 12 | — |
| NI80 | 8 | — | — | 80 | — | 12 |

The polymers (e.g., GMB and HFB) synthesized using large amounts of the hydrophobic monomers did not show LCST characteristics. These polymers were used for comparison. NI60 containing NIPAAm lost its affinity for water and hence no LCST was observed.

TABLE 13

Compositions of the monomers of the non-self-healing acrylic copolymer prepolymers for comparison (unit: mol %)

| Name | GlyMA | HEMA | TFEMA | NIPAAm | MMA | BA |
|------|-------|------|-------|--------|-----|-----|
| GMB | 8 | — | — | — | 50 | 42 |
| HFB | — | 8 | 70 | — | — | 22 |
| NI60 | 8 | — | — | 60 | — | 32 |

TABLE 14

Compositions of the monomers of the non-self-healing acrylic copolymer prepolymers (unit: mol %)

| Name | HEMA | DMAEMA | BMA |
|------|------|--------|-----|
| DMA70-HEMA | 8 | 70 | 22 |
| DMA60_HEMA | 8 | 60 | 32 |

The $T_g$ of each of the polymers prepared by free-radical polymerization can be predicted and controlled to some extent depending on the $T_g$ values and weight proportions of the monomers, as given by the following equation:

$$\frac{1}{T_g} = \frac{w_1}{T_{g,1}} + \frac{w_2}{T_{g,2}} + \frac{w_3}{T_{g,3}}$$

where $w_1$ to $w_3$ represent the weight fractions of the monomers in the polymer and $T_{g,1}$ and $T_{g,3}$ represent the theoretical $T_g$ values of the monomers.

Based on this equation, the $T_g$ values of the polymers can be predicted. The predicted $T_g$ values were in good agreement with the empirically determined values.

The solubility and LCST values of the polymers synthesized using DMAEMA and DEAEMA were pH-dependent. At a low pH, the tertiary amine groups of the monomers are quaternized and the affinity of the monomers for water increases.

The solubility and LCST values of the polymers synthesized using NIPAAm were not affected by pH. The LCST values of the polymers synthesized using HEMA were slightly lower than those of the polymers synthesized using the same amounts of DMAEMA and DEAEMA as HEMA. The polymers GMB and HFB had no LCST values and were not dissolved in water.

Figure 10:
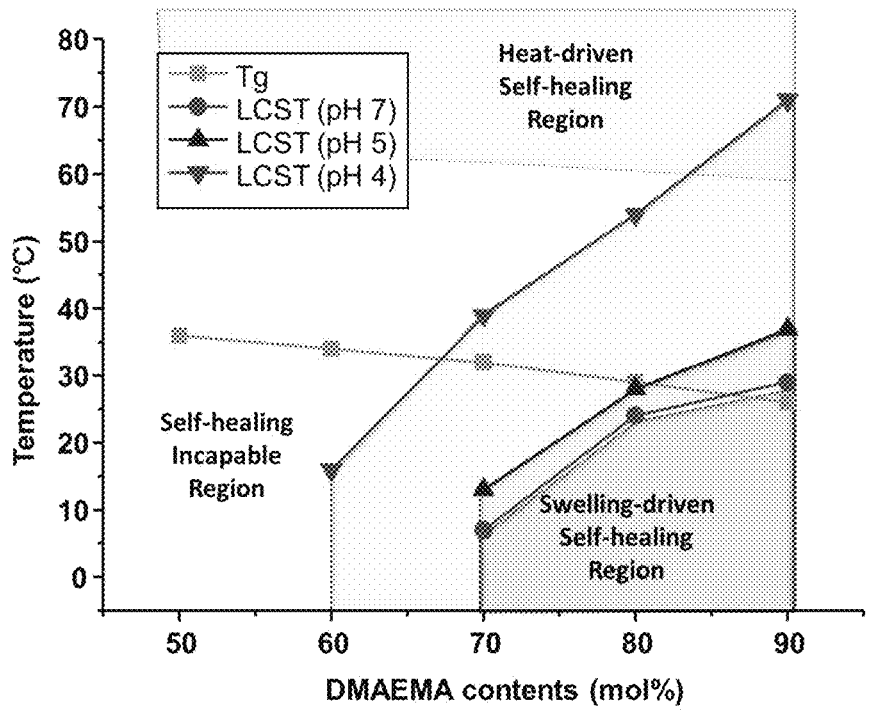
FIG. 10 graphically shows the glass transition temperature and LCST values and self-healing regions of acrylic copolymers containing different amounts of DMAEMA.
Figure 11A:
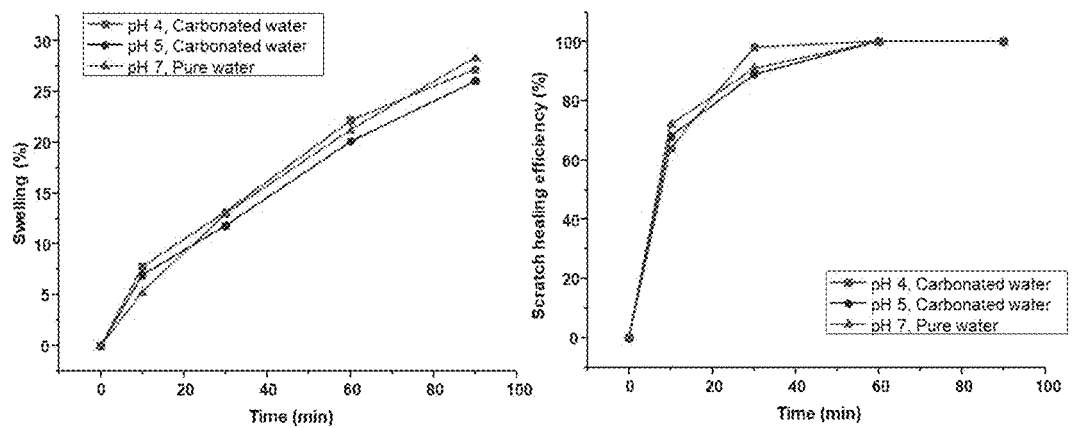
FIGS. 11a to 11e show changes in swelling (%) and scratch healing efficiency of urethane-acrylic copolymers prepared in Preparative Examples 21, 22, 20, 23, and 24 with time, respectively.
Figure 11B:
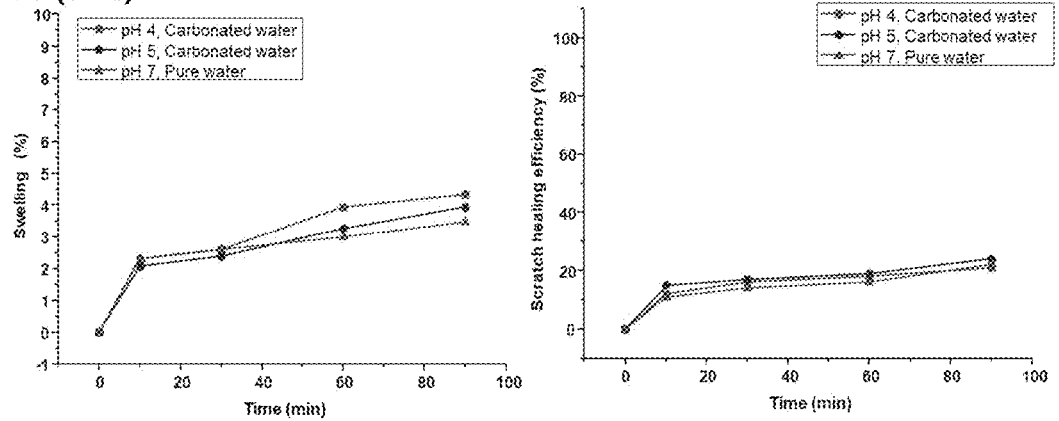
Figure 11C:
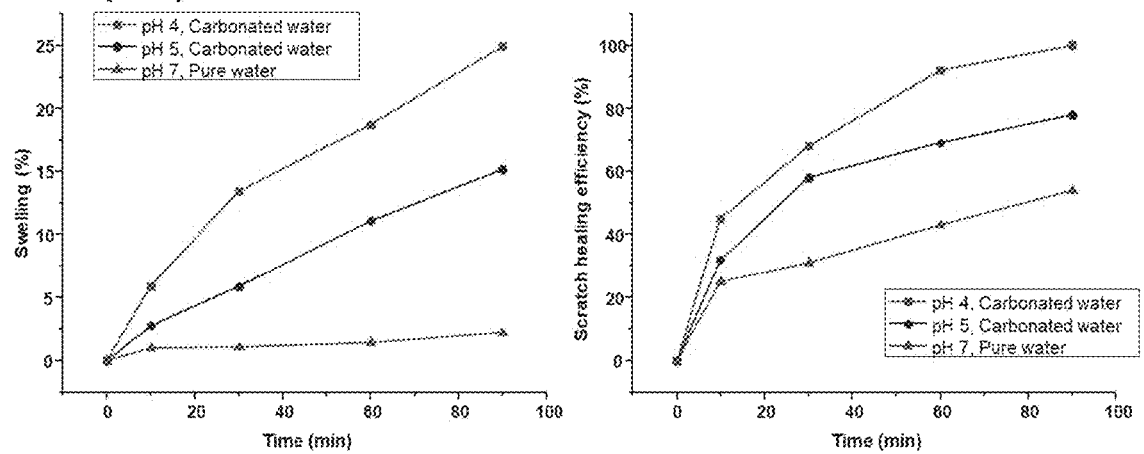
Figure 11D:
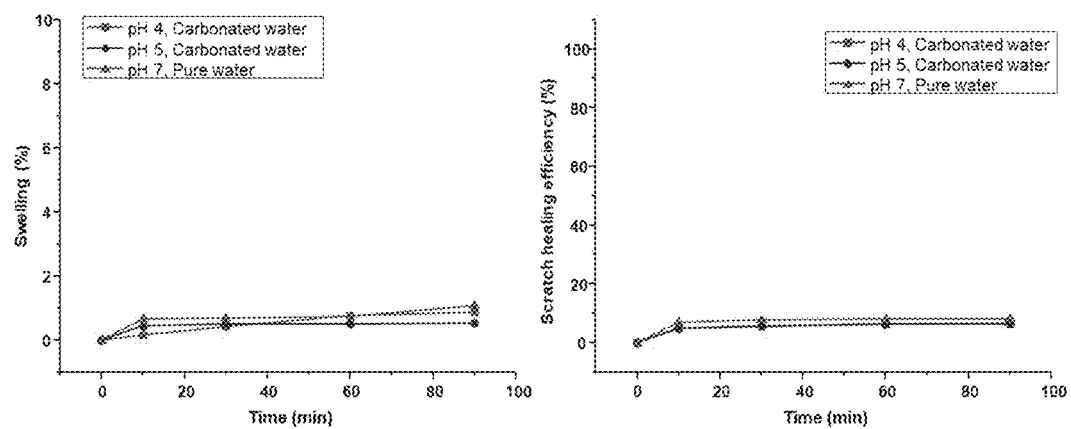
Figure 11E:
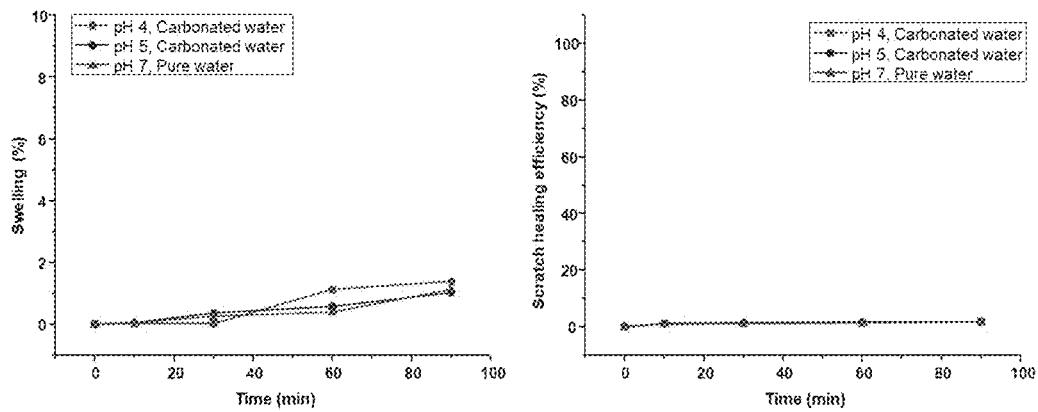

FIG. 10 graphically shows the $T_g$ and LCST values and self-healing regions of the acrylic copolymers containing different amounts of DMAEMA. Referring to FIG. 10, the $T_g$ increased with decreasing DMAEMA content. This phenomenon results from the increased content of BMA and the decreased content of DMAEMA. The $T_g$ values of the polymers containing 50-90 mol % of DMAEMA were higher than room temperature.

The LCST values were measured in carbonated water at pH 4 and pH 5 and in pure water at pH 7. The LCST increased with decreasing pH. The polymers synthesized using 60 mol % or less of DMAEMA were not dissolved in water at pH 5 and pH 7, making it impossible to measure their LCST values.

In FIG. 10, self-healing regions are colored, indicating scratch self-healing. The polymer can self-heal by its thermal mobility when heated above the $T_g$. Indeed, the polymer can self-heal only at temperatures higher to some extent than the $T_g$ (at temperatures higher by at least 20° C. than the $T_g$). In contrast, the polymer can self-heal with the aid of water or carbonated water even at temperatures just below the LCST and the self-healing efficiency is closely related to swelling (%).

Swelling (%) and Scratch Healing Efficiency Measurement Methods

1) Swelling (%)

Swelling (%) was measured to investigate the affinity of the urethane-acrylic copolymers for water. Each of the urethane-acrylic copolymers was allowed to swell by immersion in aqueous solutions at different temperatures. Thereafter, the urethane-acrylic copolymer was withdrawn from the aqueous solutions at regular time intervals. Water was removed from the surface using a membrane filter and changes in the weight of the copolymers were measured.

$$\text{Swelling (\%)} = \frac{Ws - Wd}{Wd} \times 100\,(\%)$$

where $W_s$ is the weight after swelling and $W_d$ is the weight of the dried sample.

2) Scratch Healing Efficiency

Scratch healing was analyzed by varying the width of scratches of the polymers coated on steel sheets. Specifically, each copolymer was coated to a thickness of 40-45 μm on a base coating for automobile exterior decoration using a bar coater (Num: 36). 10-25 μm wide scratches were formed manually with a scalpel. The scratched sites were completely covered with aqueous solutions under different conditions. After the lapse of a predetermined time, water was removed. After drying at room temperature for ~1 h, changes in the width of the scratches were observed.

The scratch healing efficiency was calculated by the following equation:

$$\text{Scratch healing efficiency } (SHE, \%) = \frac{La - Lb}{La} \times 100\,(\%)$$

where La is the initial scratch width and Lb is the scratch width after healing.

Based on this equation, the scratch healing efficiency (SHE, %) was defined depending on the change in scratch width.

Swelling (%) and Scratch Healing Efficiency Measurement Results

1) Swelling (%)

Figure 12A:
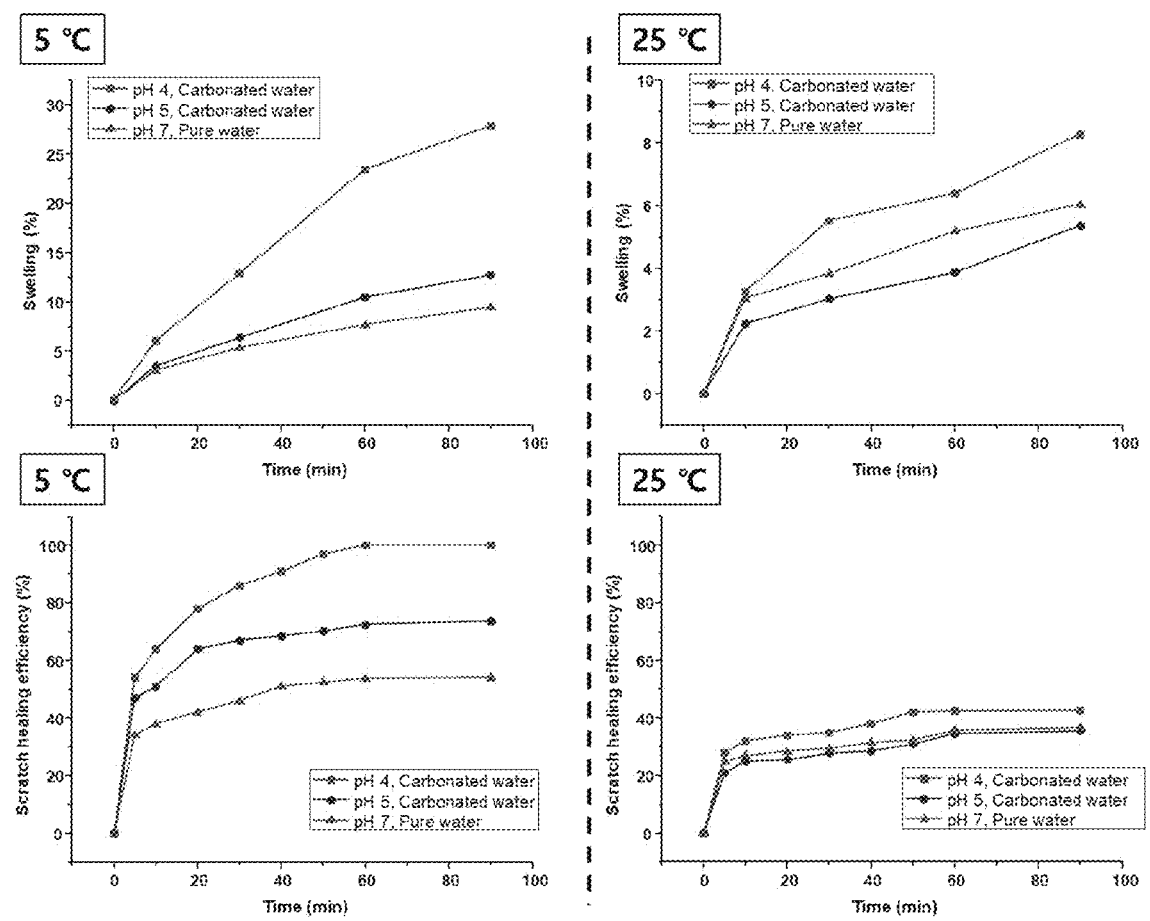
FIGS. 12a and 12b show changes in swelling (%) and scratch healing efficiency of urethane-acrylic copolymers prepared in Preparative Example 18 with time.
Figure 12B:
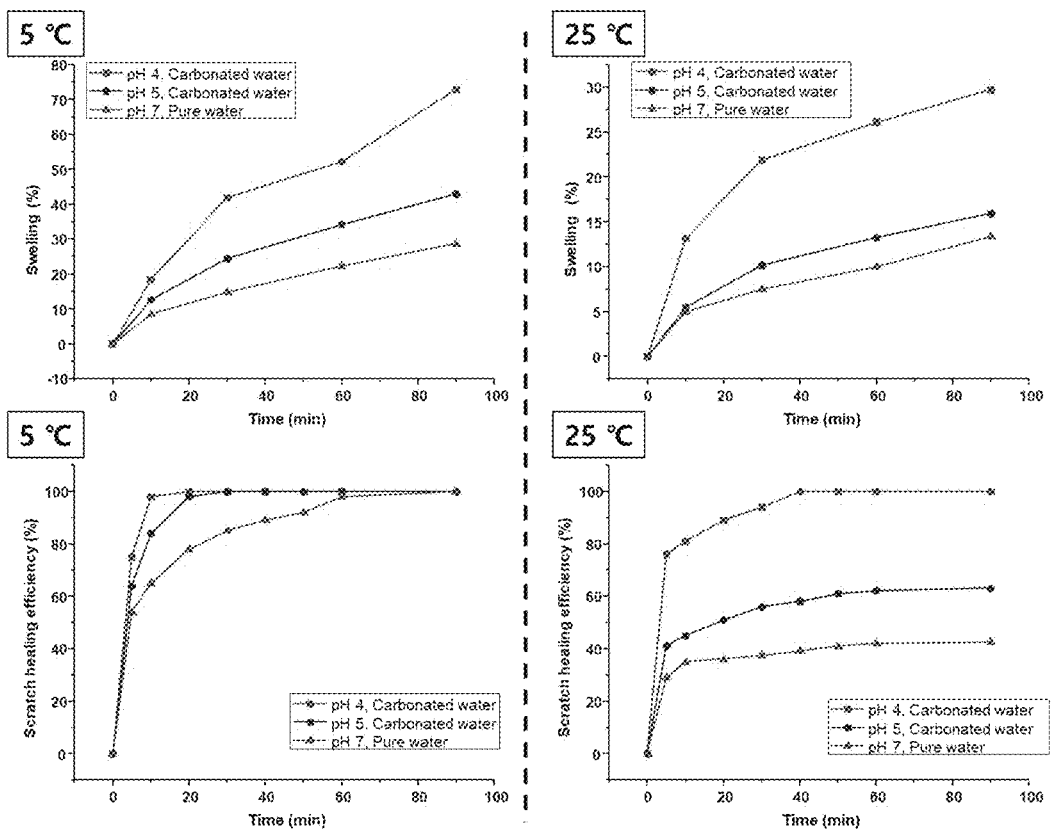

FIGS. 11a to 11e show changes in swelling (%) and scratch healing efficiency of the acrylic copolymer prepolymers prepared in Preparative Examples 21, 22, 20, 23, and 24 with time, respectively, and FIGS. 12a and 12b show changes in swelling (%) and scratch healing efficiency of the acrylic copolymer prepolymers prepared in Preparative Example 18 with time.

Referring to these figures, the swelling (%) tended to increase in the order of pH 4, pH 5, and pH 7 at 5° C., which was similar to the tendency of LCST. At 25° C., almost the same results were obtained at pH 5 and pH 7 and the affinity of the acrylic copolymer prepolymers for water deteriorated considerably. At pH 4, the acrylic copolymer prepolymers swelled to some extent. The LCST values of the acrylic copolymer prepolymers were ~39° C. at pH 4, demonstrating their affinity for water at 25° C.

2) Scratch Healing Efficiency

Scratch healing efficiency was highly correlated with swelling (%). When the swelling (%) did not exceed 20-25%, no self-healing was found. Meanwhile, the scratches were closed when the swelling (%) exceeded 20-25%. In conclusion, self-healing is achieved only when the swelling (%) exceeds 20-25%.

Scratch Healing Images

Figure 13:
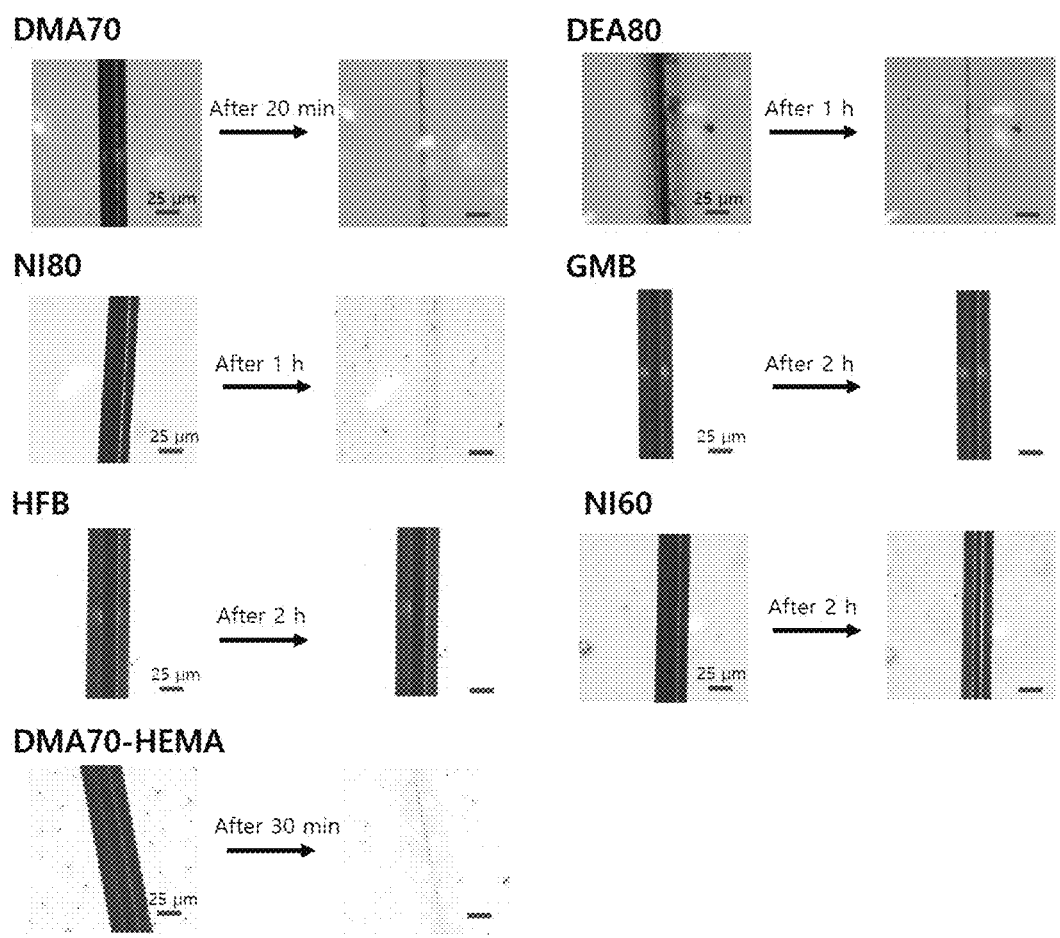
FIGS. 13 to 15 are photographs showing the scratch healing capabilities of coatings prepared in Preparative Examples 18-24.
Figure 14:
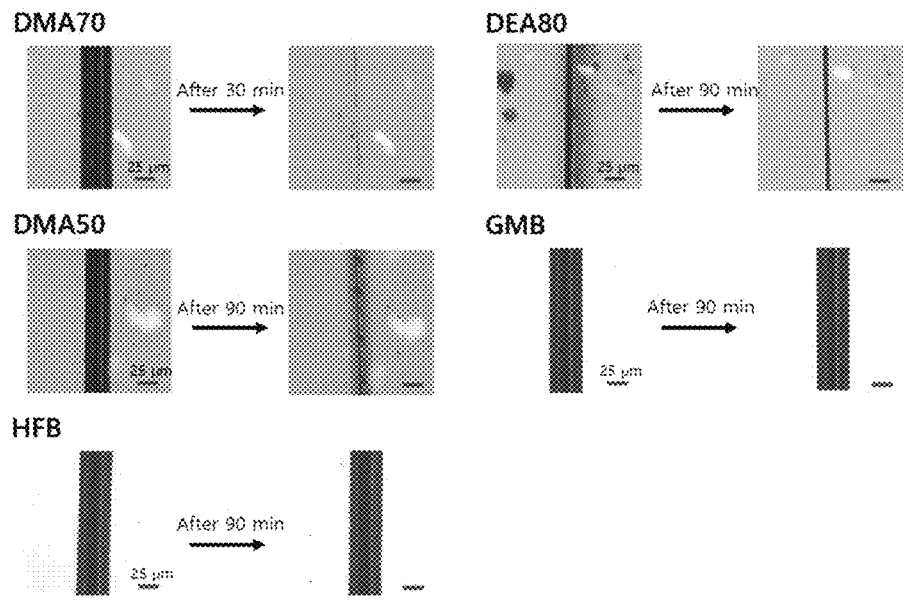
Figure 15:
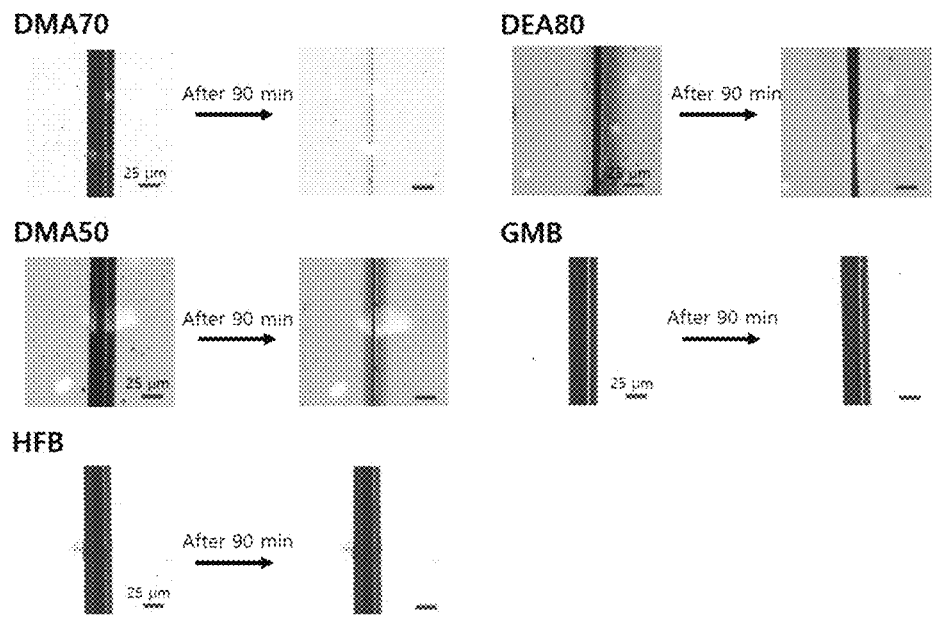
Figure 16A:
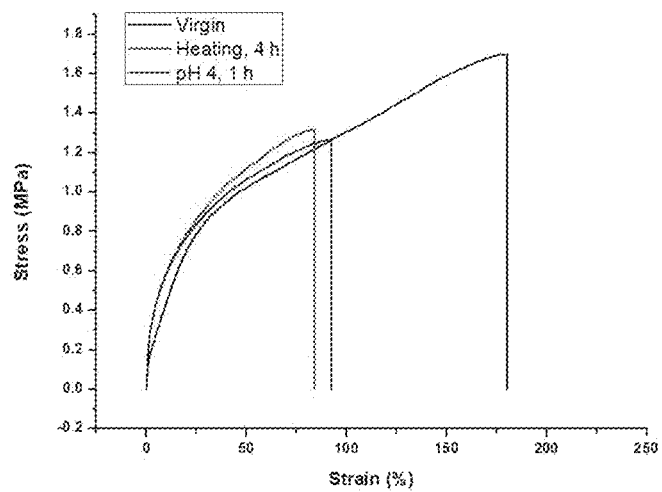
FIGS. 16a to 16d show tensile strengths of films prepared in Preparative Examples 18-20 and 24 before and after self-healing.
Figure 16B:
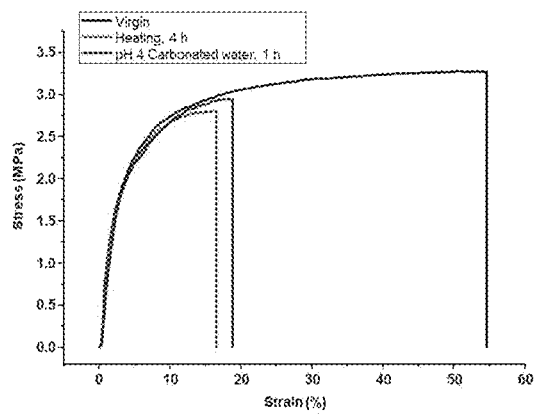
Figure 16B:
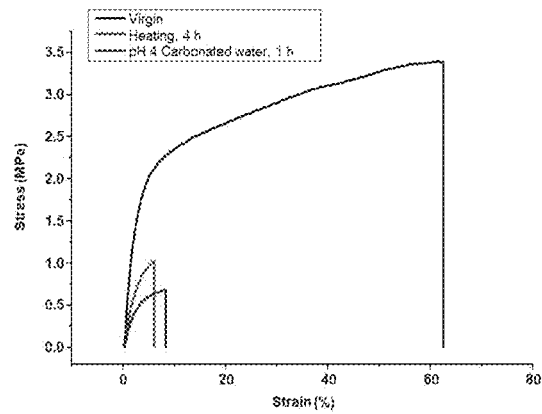
Figure 16C:
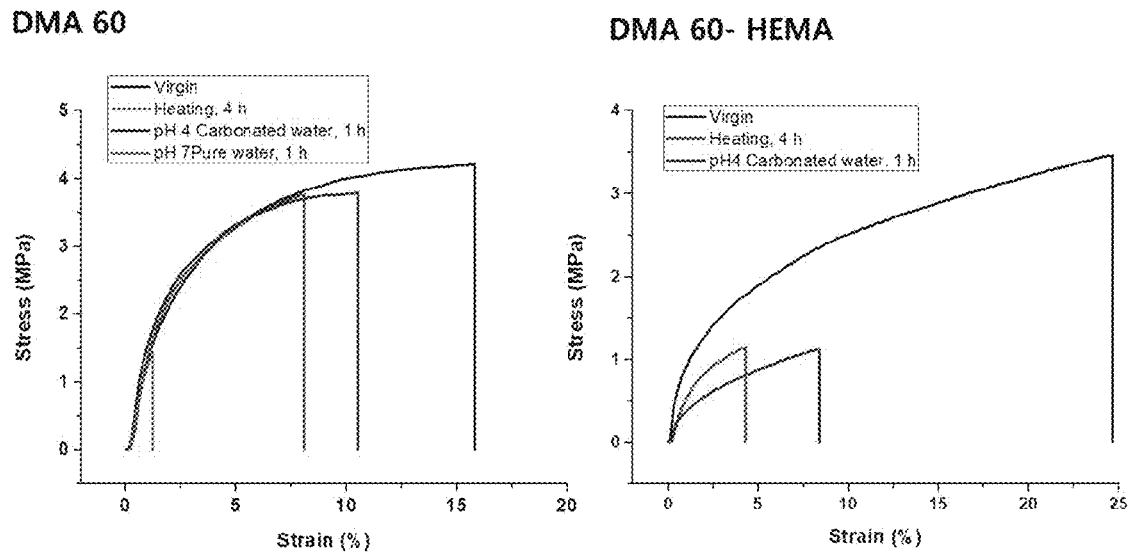
Figure 16D:
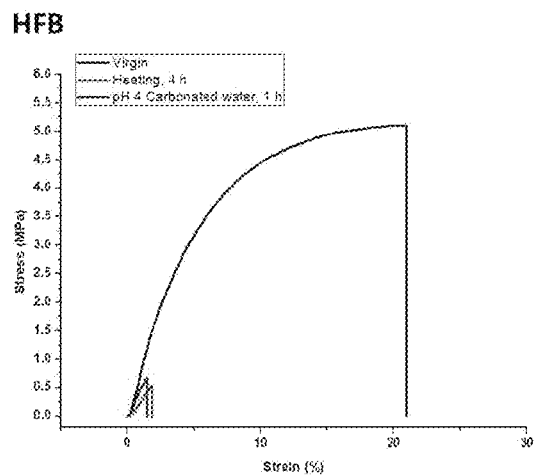

FIGS. 13 to 15 are images observed after scratch self-healing of the acrylic copolymer prepolymers prepared in Preparative Examples 18-24 in carbonated water at 5° C. Referring to FIGS. 13 to 15, DMA70, DEA80, and NI80 were able to self-heal below their LCST values whereas GMB, HFB, and NI60 showed no self-healing effect because they lacked affinity for water. On the other hand, DMA70-HEMA appeared to self-heal but did not provide substantial self-healing involving chemical bonding reactions, which was determined from the tensile test results. In conclusion, the hydrophilic polymer can self-heal superficial scratches based on simple swelling in water but provides no substantial self-healing.

Tensile Test and Results

The tensile strengths of the self-healing polymers were measured to compare and analyze the self-healing properties of the polymers. To this end, polymer specimens were constructed to have a width of 6 mm, a length of 50 mm, and a thickness of 2 mm. The tensile strength of each specimen was measured on a Universal testing machine (MCT-1150, AND, Japan) at a temperature above the $T_g$ of the polymer. Then, the sample was completely cut with a razor blade. The cut cross section was gently compressed for 1 min. After standing in air at 75° C. above the $T_g$ for 4 h, heat-driven self-healing was observed. For carbonated water-driven self-healing, the sample was completely cut, the cut cross sections were brought into contact with each other, contact sites with the scratch were sufficiently wet with carbonated water at 5° C., the wet state was maintained for 1 h, water was wiped off and removed on a membrane filter at room temperature for ~3 h, and physical properties were measured using a tensile tester.

FIGS. 16a to 16d show the measured tensile strengths of the acrylic copolymer prepolymers prepared in Preparative Examples 18-20 and 24 before and after self-healing. Referring to FIGS. 16a to 16d, DMA70 and DEA80 recovered their original physical properties to some extent. The heat-driven self-healing mechanism was similar to the carbonated water-driven self-healing mechanism. However, DMA70 and DEA80 did not completely recover their initial physical properties. This is because the self-healing mechanism is based on irreversible chemical reactions that occur only at the cross-section sites of the scratch to form new bonds only in the polymer diffused between the cut cross sections. In addition, the physical properties were improved after healing, similarly to those of the unscratched material, demonstrating that the polymer can be recovered to its original physical properties at room temperature even after swelling in water at low temperature.

DMA70-HEMA and HFB showed no substantial self-healing effect involving new chemical bonds, which is because the HEMA monomer has only one hydroxyl group capable of participating in crosslinking, failing to form ligands capable of chelating the metal catalyst (e.g., DBTDL).

Although the present invention has been described herein with reference to the foregoing embodiments, it will be understood by those skilled in the art that the invention can be implemented in other specific forms without changing the essential features of the present invention. Therefore, it should be noted that the forgoing embodiments are merely illustrative in all aspects and are not to be construed as limiting the invention. The scope of the invention is indicated by the appended claims rather than the foregoing detailed description. All changes or modifications or their equivalents made within the meanings and scope of the claims should be construed as falling within the scope of the invention.

What is claimed is:

1. A self-healing acrylic copolymer represented by Formula 1:

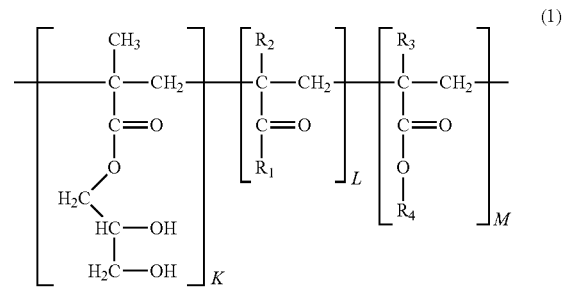

wherein $R_1$ is

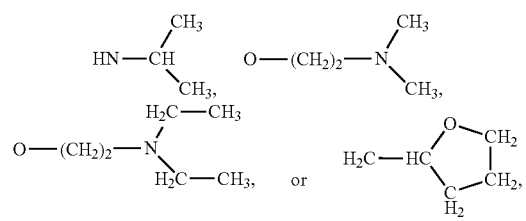

$R_2$ and $R_3$ are each independently H or $CH_3$, $R_4$ is a methyl or butyl group; and wherein K, L, and M representing the mole fractions of the corresponding repeating units are 0.08, 0.5 to 0.9, and 0.02 to 0.42, respectively, and satisfy the relation K+L+M=1.

2. The self-healing acrylic copolymer according to claim 1, wherein the self-healing acrylic copolymer is represented by one of the following formulae:

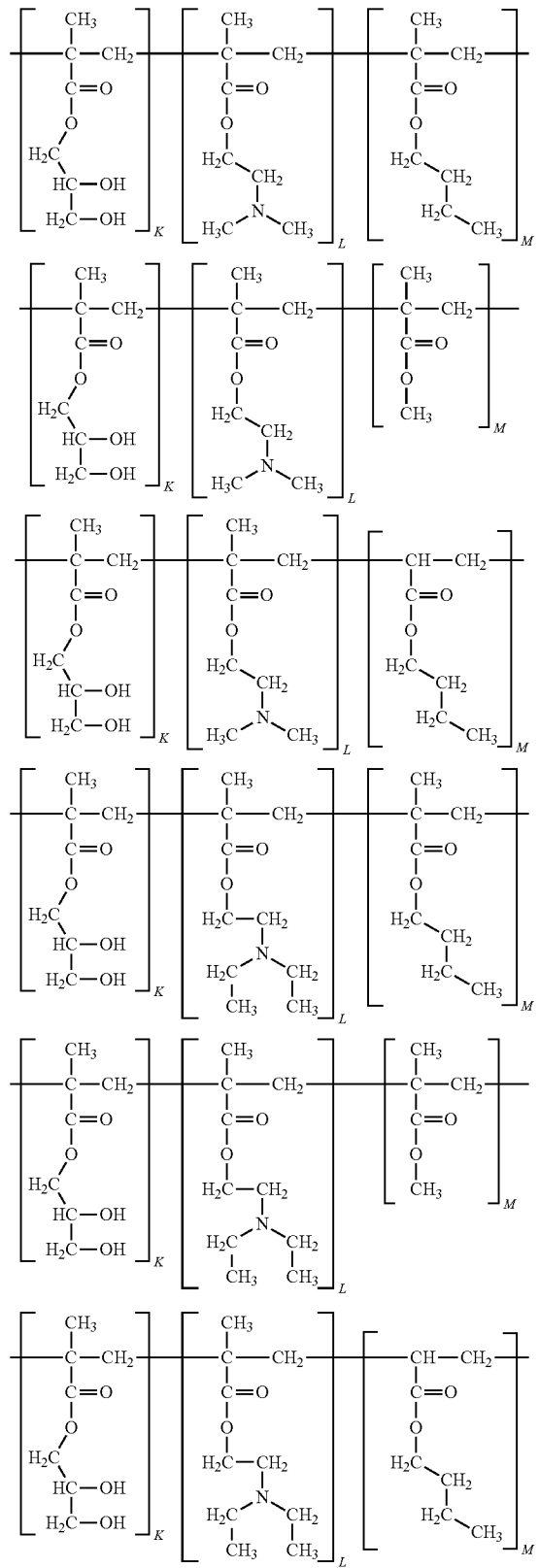

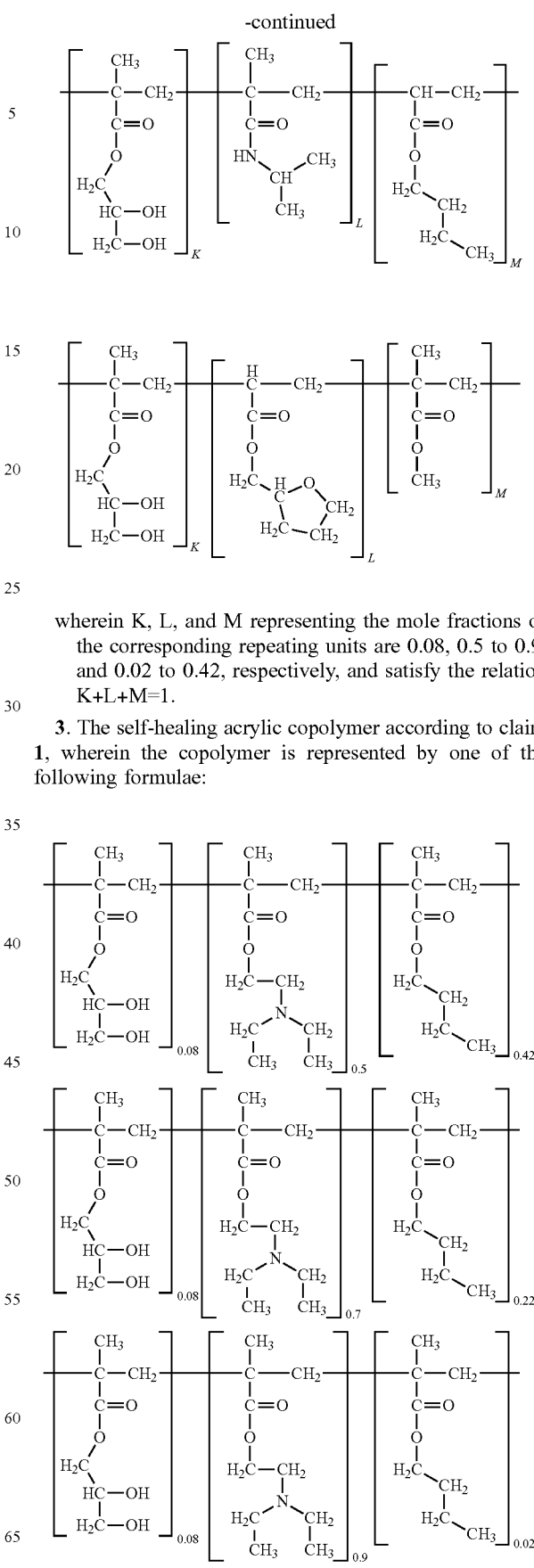

wherein K, L, and M representing the mole fractions of the corresponding repeating units are 0.08, 0.5 to 0.9, and 0.02 to 0.42, respectively, and satisfy the relation K+L+M=1.

3. The self-healing acrylic copolymer according to claim 1, wherein the copolymer is represented by one of the following formulae:

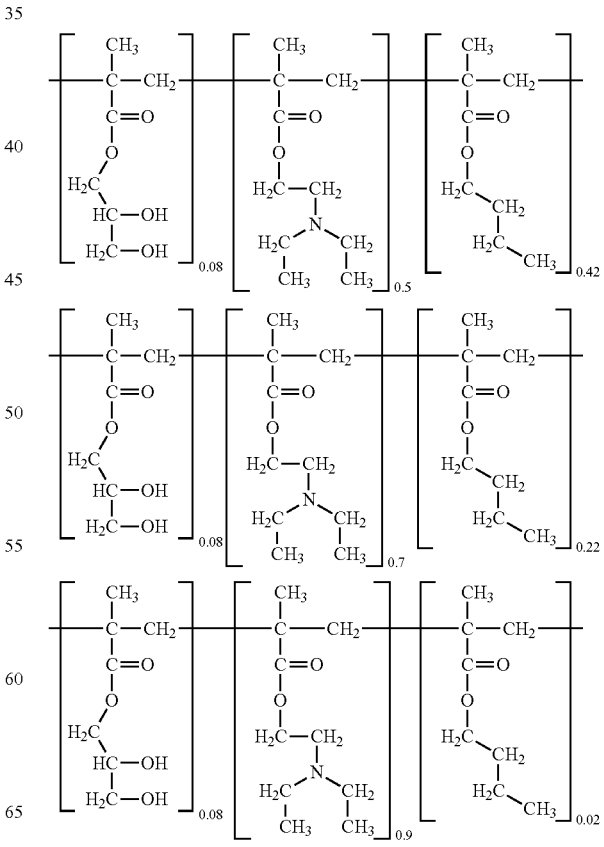

-continued

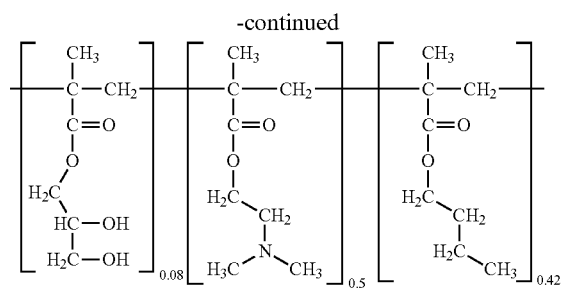

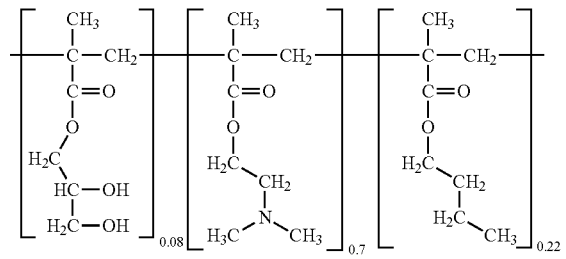

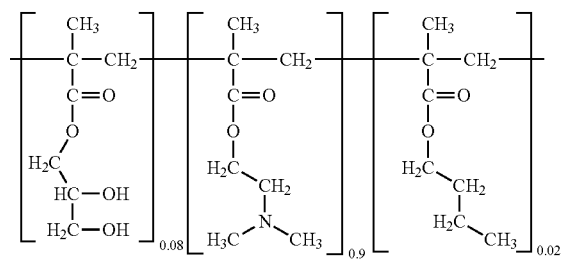

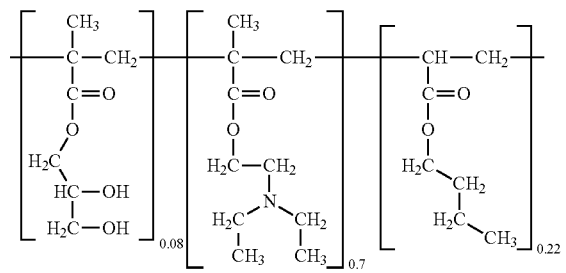

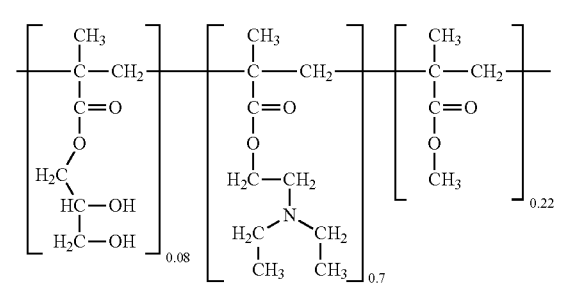

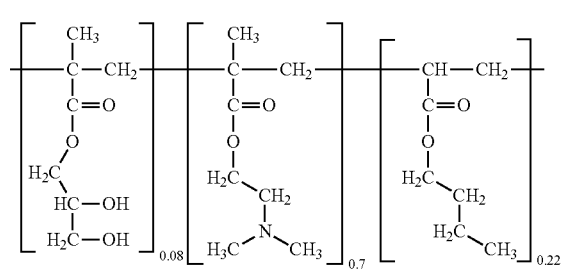

-continued

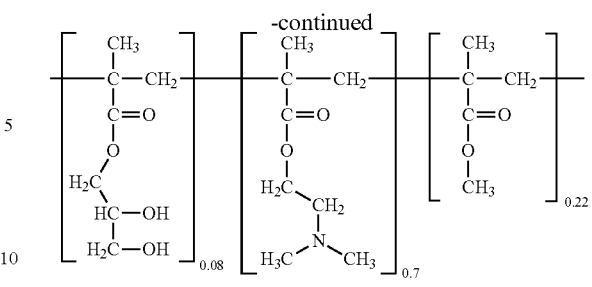

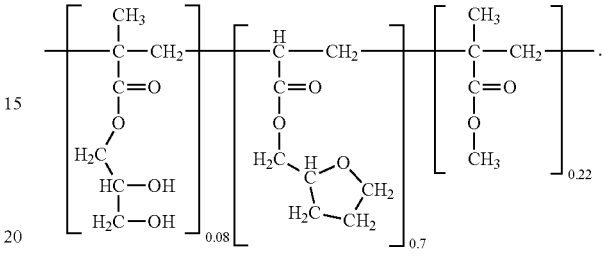

4. A self-healing crosslinked copolymer prepared by crosslinking the acrylic copolymer according to claim 1 with a crosslinking agent.

5. The self-healing crosslinked copolymer according to claim 4, wherein the crosslinking forms urethane bonds.

6. A coating comprising the self-healing crosslinked copolymer according to claim 4.

7. A method for self-healing of a urethane-acrylic copolymer prepared by crosslinking an acrylic copolymer represented by Formula 1:

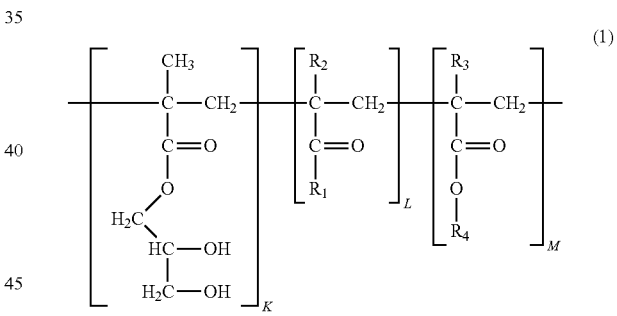

wherein $R_1$ is

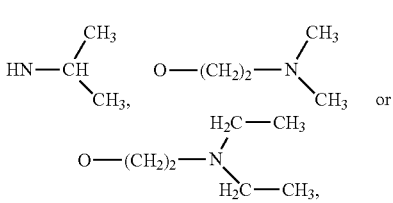

$R_2$ and $R_3$ are each independently H or $CH_3$, $R_4$ is a methyl or butyl group, and K, L, and M representing the mole fractions of the corresponding repeating units are 0.08, 0.5 to 0.9, and 0.02 to 0.42, respectively, and satisfy the relation K+L+M=1, the method comprising adding water to the urethane-acrylic copolymer at a temperature below the lower critical solution temperature (LCST) of the urethane-acrylic copolymer and drying the wet copolymer.

8. The method according to claim 7, wherein the copolymer is represented by one of the following formulae:
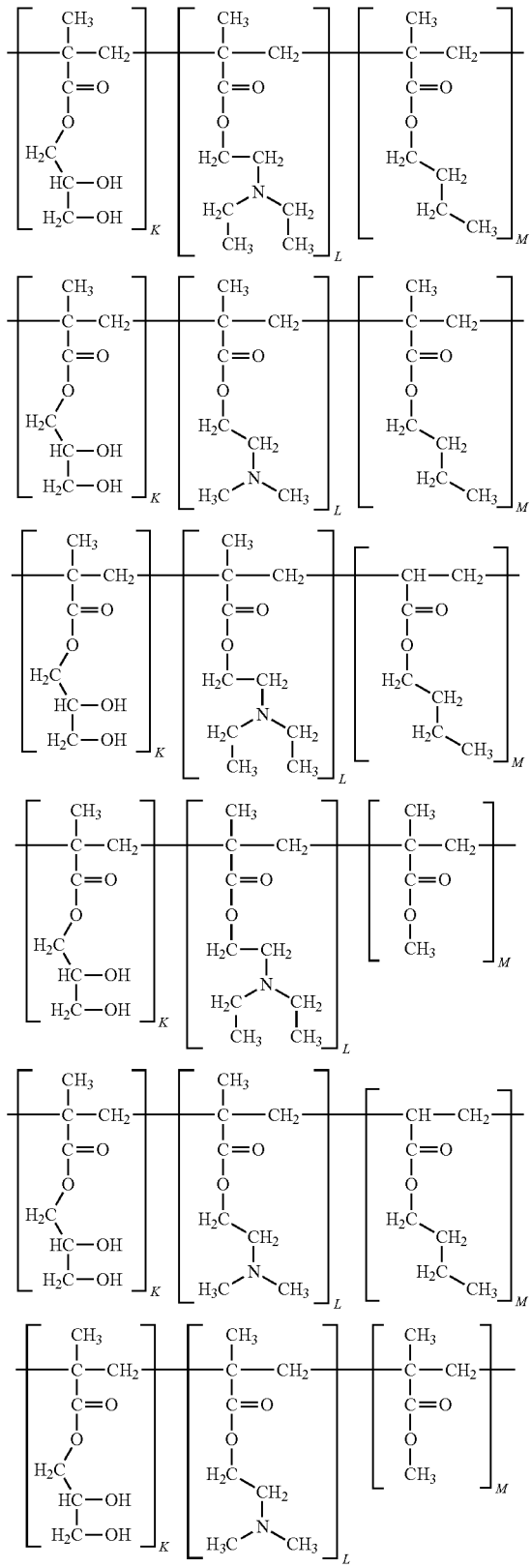
9. The method according to claim 7, wherein the copolymer is represented by one of the following formulae:
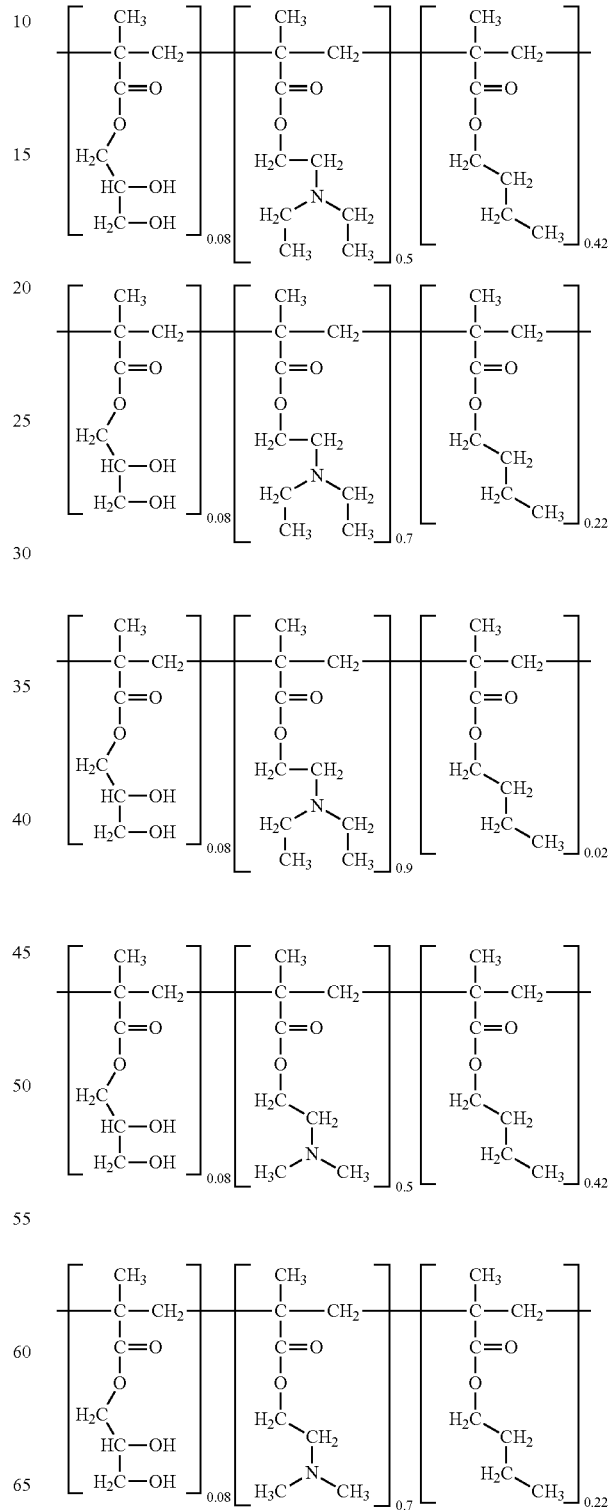
wherein K, L, and M representing the mole fractions of the corresponding repeating units are 0.08, 0.5 to 0.9, and 0.02 to 0.42, respectively, and satisfy the relation K+L+M=1.

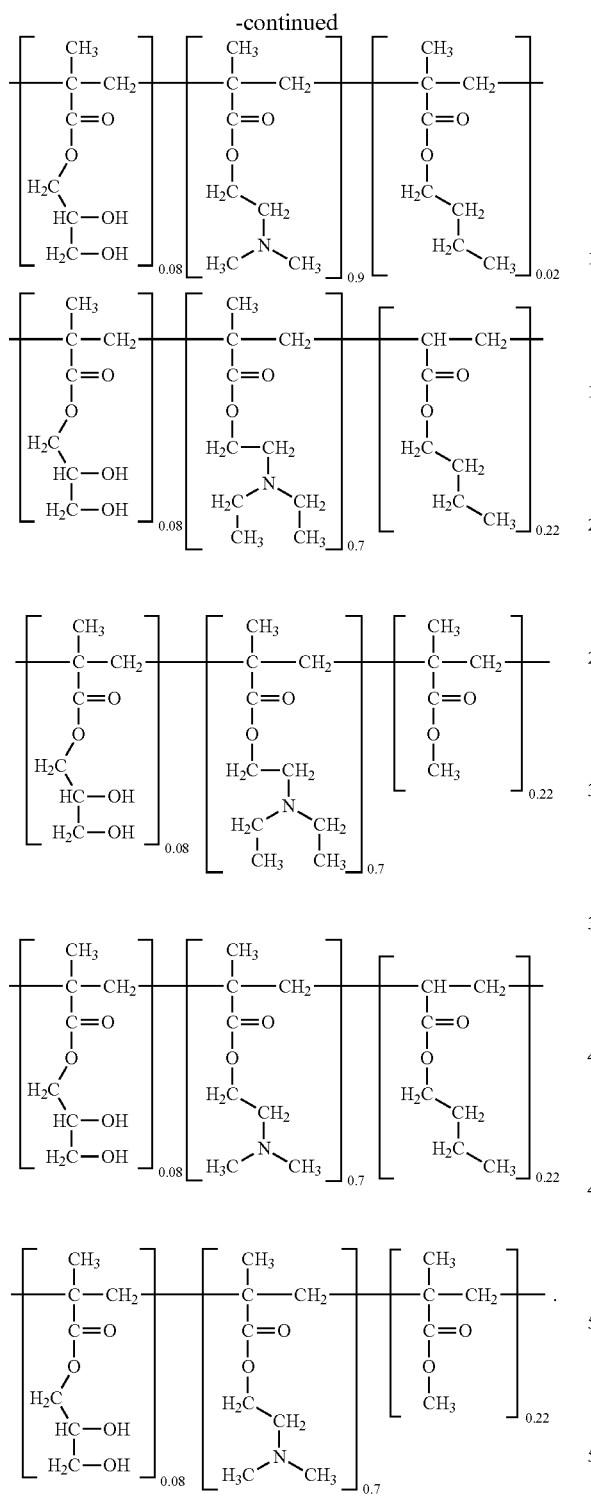

10. The method according to claim 7, wherein the pH of the water is adjusted to 4 to 7.

11. The method according to claim 7, wherein the reaction temperature upon water addition is from 0 to 30° C.

12. The method according to claim 10, wherein the water is carbonated water.

13. A method for self-healing of a urethane-acrylic copolymer prepared by crosslinking an acrylic copolymer represented by Formula 1:

wherein $R_1$ is $R_2$ and $R_3$ are each independently H or $CH_3$, $R_4$ is a methyl or butyl group, and K, L, and M representing the mole fractions of the corresponding repeating units are 0.08, 0.5 to 0.9, and 0.02 to 0.42, respectively, and satisfy the relation K+L+M=1, the method comprising adding carbon dioxide-containing water to the urethane-acrylic copolymer at a temperature above the LCST of the urethane-acrylic copolymer and drying the wet copolymer.

14. The method according to claim 13, wherein the copolymer is represented by one of the following formulae:

-continued
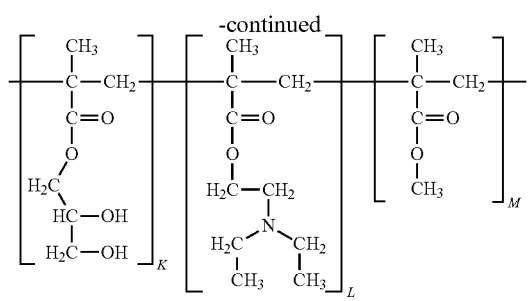
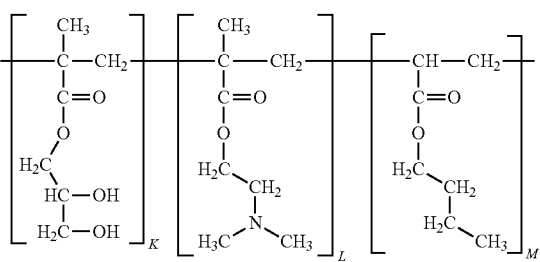
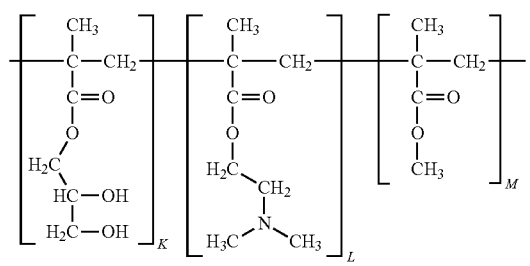
wherein K, L, and M representing the mole fractions of the corresponding repeating units are 0.08, 0.5 to 0.9, and 0.02 to 0.42, respectively, and satisfy the relation K+L+M=1.
15. The method according to claim 13, wherein the copolymer is represented by one of the following formulae:
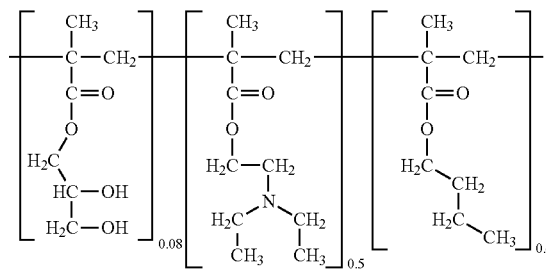
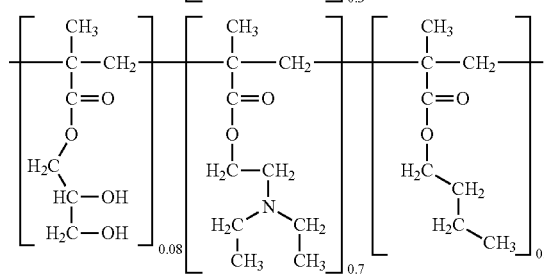
-continued
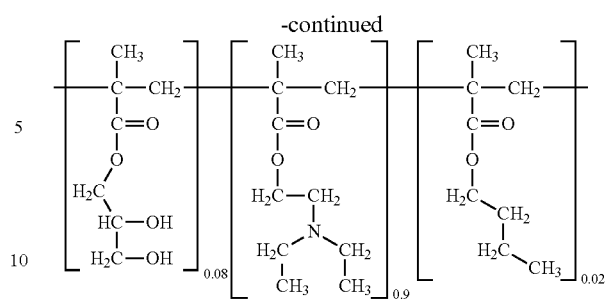
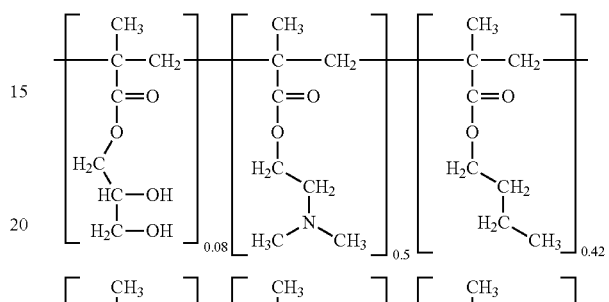
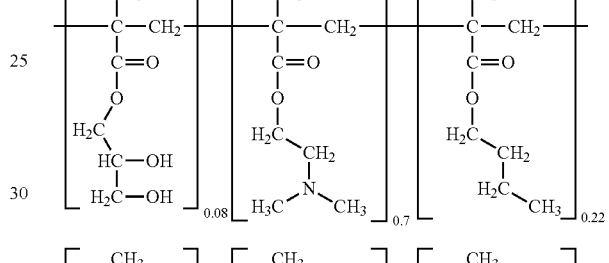
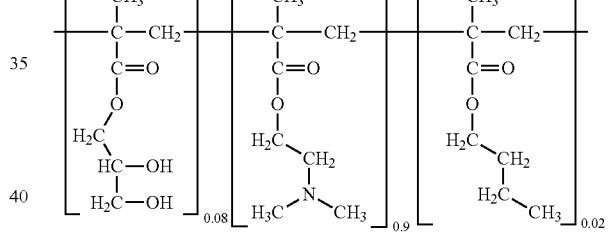
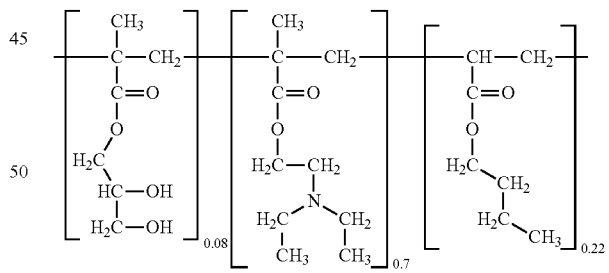
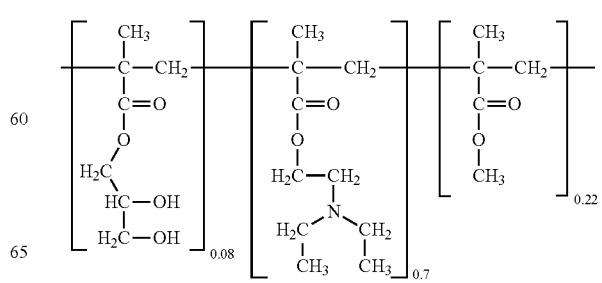

-continued
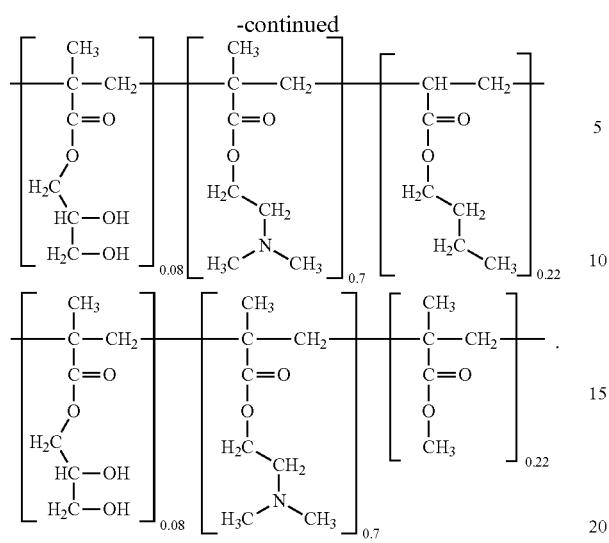
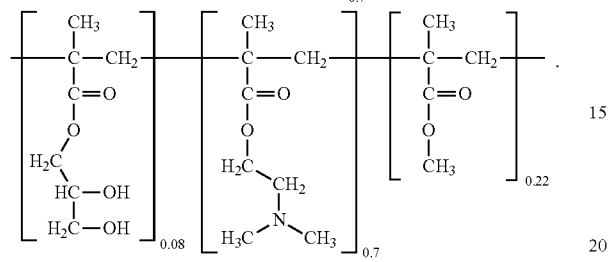
16. The method according to claim 13, wherein the pH of the water is adjusted to 4 to 7.
17. The method according to claim 13, wherein the reaction temperature upon water addition is from 0 to 30° C.
18. The method according to claim 13, wherein the water is carbonated water.
* * * * *